US009467415B2

United States Patent
Xu et al.

(10) Patent No.: US 9,467,415 B2
(45) Date of Patent: Oct. 11, 2016

(54) METHOD, DEVICE AND SYSTEM FOR PROCESSING GROUP MESSAGE

(71) Applicant: Huawei Technologies Co., Ltd., Shenzhen (CN)

(72) Inventors: Xiaoying Xu, Shenzhen (CN); Xiaoxiao Zheng, Shenzhen (CN); Lingli Pang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 13/972,499

(22) Filed: Aug. 21, 2013

(65) Prior Publication Data

US 2014/0011527 A1 Jan. 9, 2014

Related U.S. Application Data

(63) Continuation of application No. PCT/CN2012/070836, filed on Feb. 2, 2012.

(30) Foreign Application Priority Data

Feb. 21, 2011 (CN) .......................... 2011 1 0042015

(51) Int. Cl.
*H04W 76/02* (2009.01)
*H04L 12/58* (2006.01)
(Continued)

(52) U.S. Cl.
CPC ................ *H04L 51/38* (2013.01); *H04W 4/08* (2013.01); *H04W 76/002* (2013.01); *H04W 76/022* (2013.01)

(58) Field of Classification Search
None
See application file for complete search history.

(56) References Cited

U.S. PATENT DOCUMENTS 6,909,702 B2 * 6/2005 Leung .................... H04L 29/06
370/252
7,636,581 B1 * 12/2009 Choksi .................... H04W 4/08
455/418

(Continued)

FOREIGN PATENT DOCUMENTS

CN           1476259 A      2/2004
CN       101018168 A      8/2007

(Continued)

OTHER PUBLICATIONS

3GPP, "3$^{rd}$ Generation Partnership Project; Technical Specification Group Radio Access Network; Radio Resource Control (RRC); Protocol Specification" (Release 10) 3GPP TS 25.331. V10.2.0, Dec. 2010, 1,834 pages.

*Primary Examiner* — Daniel Lai
(74) *Attorney, Agent, or Firm* — Brinks Gilson & Lione

(57) ABSTRACT

The present invention provides a method, device and system for processing a group message. The method comprises: when a group corresponding to a first group identifier has an updated group message, receiving a message corresponding to the first group identifier sent from a public data network (PDN); sending the message corresponding to the first group identifier to a core network node, so that the core network node sends the message to a radio network controller (RNC), which acquires, according to the first group identifier, indication bit and time information for sending the message; and sending the first group identifier, the indication bit, the time information and the message to a base station. The technical solution of the present invention can effectively improve the efficiency for an application server to send a message to each UE in the group.

12 Claims, 15 Drawing Sheets

(51) Int. Cl.
*H04W 4/08* (2009.01)
*H04W 76/00* (2009.01)

(56) References Cited

U.S. PATENT DOCUMENTS

| | | |
|---|---|---|
| 2003/0083086 A1 | 5/2003 | Toyryla et al. |
| 2004/0152476 A1* | 8/2004 | Kuwano ............... H04W 68/00 455/459 |
| 2004/0180675 A1* | 9/2004 | Choi ................... H04L 12/1877 455/458 |
| 2006/0104225 A1* | 5/2006 | Kim ..................... H04L 12/189 370/313 |
| 2009/0303909 A1* | 12/2009 | Farhoudi ............. H04W 76/005 370/312 |
| 2012/0030358 A1* | 2/2012 | MacKenzie ....... H04W 52/0216 709/226 |
| 2012/0110074 A1* | 5/2012 | Getchius ............. H04L 61/1523 709/204 |
| 2012/0170502 A1* | 7/2012 | Korus .................... H04W 4/06 370/312 |

FOREIGN PATENT DOCUMENTS

| | | |
|---|---|---|
| CN | 101534566 A | 9/2009 |
| WO | WO 2005/039104 A1 | 4/2005 |

* cited by examiner

METHOD, DEVICE AND SYSTEM FOR PROCESSING GROUP MESSAGE

CROSS-REFERENCE TO RELATED APPLICATIONS

This application is a continuation of International Application No. PCT/CN2012/070836, filed on Feb. 2, 2012, which claims priority to Chinese Patent Application No. 201110042015.0, filed on Feb. 21, 2011, both of which are hereby incorporated by reference in their entireties.

TECHNICAL FIELD

The embodiments of the invention relate to the field of communication technologies, and particularly, to a method, a device and a system for processing a group message.

BACKGROUND

With the widespread usage of the smart user equipment (UE) (e.g., the mobile phone), applications on the UE are increasingly richer. Application services, such as microblog and social network instant messaging (e.g., Twitter, Facebook, QQ and MSN) are more and more popular in the users.

With regard to application services such as Twitter, Facebook, QQ and MSN, users corresponding to the UEs are usually managed on a group basis in corresponding Application Server (AS) according to the users' requirement. For example, the same message is usually required to be sent to all users in one group. However, the UEs in the same group in the AS will not be uniformly managed at the network side. For example, with regard to services such as QQ and MSN, a message is usually sent to each UE in the group through the Gateway GPRS Support Node (GGSN) and the Serving GPRS Support Node (SGSN) in the Core Network (CN), and the Radio Network Controller (RNC) and the NodeB (NB) in the Universal Mobile Telecommunication System Terrestrial Radio Access Network (UTRAN), respectively. With regard to services such as Twitter and Facebook, corresponding AS adopts the instant pushing mode, i.e., generally pushing a message to each UE in the group through the GGSN and the SGSN in the CN, and the RNC and the NB in the UTRAN, respectively.

During the implementation of the present invention, the inventor finds that the prior art at least has the following problem: in the prior art, when the AS sends a message to the UEs in the same group, the message needs to be sent to each UE in the group through the CN and the UTRAN; thus in the prior art, the AS is low efficient in sending a message to each UE in the same group.

SUMMARY

The embodiments of the present invention provide a method, device and system for processing a group message, so as to overcome the defect in the prior art that the AS is low efficient in sending a message to each UE in the same group.

The embodiments of the present invention provide a method for processing group message, comprising: when a group corresponding to a first group identifier has an updated group message, receiving a message corresponding to the first group identifier sent from a Public Data Network (PDN); and sending the message corresponding to the first group identifier to a core network node, so that the core network node sends the message to a Radio Network Controller (RNC), which acquires, according to the first group identifier, indication bit and time information for sending the message; and sending the first group identifier, the indication bit, the time information and the message to a NodeB, indicating the NodeB to set a bit according to the indication bit, and sending the indication bit, the first group identifier and the message to a user equipment (UE) corresponding to a user in the group corresponding to the first group identifier in a service range of the NodeB, according to the time information.

The embodiments of the present invention further provide a method for processing group message, comprising: receiving a message corresponding to a first group identifier sent from a core network node, wherein the message is an updated group message in a group corresponding to the first group identifier or a group message notification; acquiring, according to the first group identifier, indication bit and time information for sending the message; and sending the first group identifier, the indication bit, the time information and the message to a NodeB, indicating the NodeB to set indication information in the indication bit, and to send the indication information set in the indication bit, the first group identifier and the message to a UE corresponding to a user in the group corresponding to the first group identifier in a service range of the NodeB, according to the time information.

The embodiments of the present invention further provide a method for processing group message, comprising: acquiring indication bit according to a pre-stored first group identifier; acquiring indication information in the indication bit, and determining whether to receive a message corresponding to the first group identifier, wherein the message is an updated group message or a group message notification corresponding to the first group identifier, and the indication information is set in the indication bit by a NodeB according to an indication of an RNC; when the message corresponding to the first group identifier is to be received, receiving the first group identifier sent from the NodeB according to the indication of the RNC, and verifying whether the received first group identifier is same as the pre-stored first group identifier; and when the received first group identifier is same as the pre-stored first group identifier, receiving the message sent from the NodeB according to the indication of the RNC.

The embodiments of the present invention further provide a method for processing group message, comprising: acquiring indication bit according to a pre-stored first group identifier; acquiring indication information in the indication bit, and determining whether to receive a message corresponding to the first group identifier, wherein the message is an updated group message or a group message notification corresponding to the first group identifier, and the indication information is set in the indication bit by a NodeB according to an indication of an RNC; when the message corresponding to the first group identifier is to be received, receiving a data packet carrying an indication identifier and the message sent from the NodeB according to the indication of the RNC; and detecting whether a first group identifier corresponding to the indication identifier is same as the pre-stored first group identifier; and if so, determining that the message is corresponding to the first group identifier.

The embodiments of the present invention further provide a PUSH server device, comprising: a receiving module configured to receive a message corresponding to a first group identifier sent from a PDN, when a group corresponding to the first group identifier has an updated group message, wherein the message is the updated group message or a group message notification; and a sending module configured to send the message corresponding to the first group identifier to a core network node, so that the core network node sends the message to an RNC, which acquires, according to the first group identifier, indication bit and time information for sending the message; and send the first group identifier, the indication bit, the time information and the message to a NodeB, indicate the NodeB to set a bit according to the indication bit, and send the indication bit, the first group identifier and the message to a UE corresponding to a user in the group corresponding to the first group identifier in a service range of the NodeB, according to the time information.

The embodiments of the present invention further provide an RNC device, comprising: a receiving module configured to receive a message corresponding to a first group identifier sent from a core network node, wherein the message is an updated group message in the group corresponding to the first group identifier or a group message notification; an acquiring module configured to acquire, according to the first group identifier, indication bit and time information for sending the message; and a sending module configured to send the first group identifier, the indication bit, the time information and the message to a NodeB, indicate the NodeB to set indication information in the indication bit, and send the indication information set in the indication bit, the first group identifier and the message to a UE corresponding to a user in the group corresponding to the first group identifier in a service range of the NodeB, according to the time information.

The embodiments of the present invention further provide a UE, comprising: an acquiring module configured to acquire indication bit according to a pre-stored first group identifier; the acquiring module is further configured to acquire indication information in the indication bit, and determine whether to receive a message corresponding to the first group identifier, wherein the message is an updated group message or a group message notification corresponding to the first group identifier, and the indication information is set in the indication bit by a NodeB according to an indication of an RNC; a receiving module configured to receive the first group identifier sent from the NodeB according to the indication of the RNC when the message corresponding to the first group identifier is to be received, and verify whether the received first group identifier is same as the pre-stored first group identifier; and the receiving module is further configured to receive the message sent from the NodeB according to the indication of the RNC when the received first group identifier is same as the pre-stored first group identifier.

The embodiments of the present invention further provide a UE, comprising: an acquiring module configured to acquire indication bit according to a pre-stored first group identifier; the acquiring module is further configured to acquire indication information in the indication bit, and determine whether to receive a message corresponding to the first group identifier, wherein the message is an updated group message or a group message notification corresponding to the first group identifier, and the indication information is set in the indication bit by a NodeB according to an indication of an RNC; a receiving module configured to receive a data packet carrying an indication identifier and the message sent from the NodeB according to the indication of the RNC, when the message corresponding to the first group identifier is to be received; and a processing module configured to detect whether a first group identifier corresponding to the indication identifier is same as the pre-stored first group identifier; and if so, determine that the message is corresponding to the first group identifier.

The embodiments of the present invention further provide a mobile communication network, comprising a PUSH server, a GGSN, an SGSN (core network node), an RNC and a NodeB; the PUSH server is configured to receive a message corresponding to a first group identifier sent from an AS, when a group corresponding to the first group identifier has an updated group message, wherein the message is the updated group message or a group message notification; and send the message corresponding to the first group identifier to the core network node; the core network node is configured to receive the message and send the message to the RNC; and the RNC is configured to receive the message and acquire, according to the first group identifier, indication bit and time information for sending the group message; send the first group identifier, the indication bit, the time information and the message to the NodeB; indicate the NodeB to set a bit according to the indication bit, and send the indication bit, the first group identifier and the message to a UE corresponding to a user in the group corresponding to the first group identifier in a service range of the NodeB, according to the time information.

Through the technical solution of the embodiment, a group message or a group message notification may be sent to the UEs in a group of the AS on a group basis when the group has an updated message. In addition, the group message or the group message notification only needs to be sent to the UEs in the same group for one time, rather than being sent to different UEs respectively for multiple times in the prior art, thus the efficiency for the AS to send a message to each UE in the group can be effectively improved.

BRIEF DESCRIPTION OF DRAWINGS

In order to more clearly describe the technical solutions of the prior art or the embodiments of the present invention, the drawings to be used in the descriptions of the embodiments or the prior art will be briefly introduced as follows. Obviously, the following drawings just illustrate some embodiments of the present invention, and a person skilled in the art can obtain other drawings from these drawings without paying any creative effort.

DESCRIPTION OF EMBODIMENTS

Figure 1:
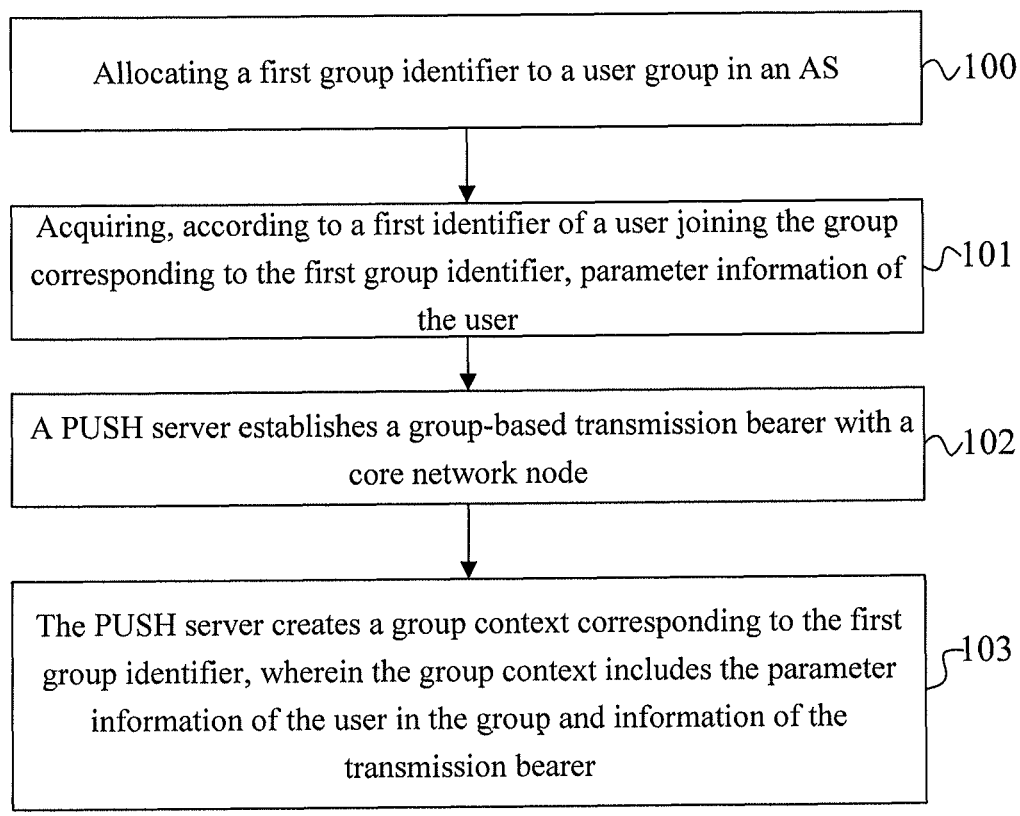
FIG. 1 is a flowchart of a group managing method provided by an embodiment of the present invention.

In order that the objects, technical solutions and advantages of the present invention are clearer, the technical solutions of the embodiments of the present invention will be clearly and completely described as follows with reference to the drawings. Obviously, those described herein are just parts of the embodiments of the present invention rather than all the embodiments. Based on the embodiments of the present invention, any other embodiment obtained by a person skilled in the art without paying any creative effort shall fall within the protection scope of the present invention.

The technical solutions of the invention can be applied to various communication systems, such as Global System for Mobile communications (GSM), Code Division Multiple Access (CDMA) system, Wideband Code Division Multiple Access Wireless (WCDMA), General Packet Radio Service (GPRS) and Long Term Evolution (LTE).

In addition, respective aspects will be described herein in conjunction with the user equipment (UE) and/or the base station. The UE may refer to a device that provides the user with voices and/or data connectivity. The UE may be connected to a computing device such as laptop computer or desktop computer, or other communication device such as a self-contained device like the Personal Digital Assistant (PDA). The wireless terminal may also be called as system, subscriber unit, subscriber station, mobile station, mobile, remote station, access point, remote terminal, access terminal, user terminal, user agent, user device or user equipment. The UE may be subscriber station, wireless device, cellular phone, Personal Communication Service (PCS) phone, cordless phone, Session Initiation Protocol (SIP) phone, Wireless Local Loop (WLL) station, Personal Digital Assistant (PDA), handheld device having the wireless connection function, or other processing device connected to the wireless modem.

The base station (e.g., access point) may refer to a device in an access network which communicates with the wireless terminal through one or more sectors at the air interface. The base station may be used to convert the received air frame and the Internet Protocol (IP) packet into each other, as a router between the wireless terminal and the rest part of the access network, wherein the rest part of the access network may include an IP network. The base station may further coordinate an attribute management of the air interface. For example, the base station may be a Base Transceiver Station (BTS) in the GSM or CDMA, a NodeB in the WCDMA, or an evolutional NodeB (eNB or e-NodeB) in the LTE, and it is not limited in the present invention.

Respective aspects will be described in the form of a system that may include one or more devices, components, modules or units. It shall be understood or appreciated that various systems may include additional devices, components, modules and/or units, and/or not include all those devices, components, modules and units discussed with reference to the drawings. In another aspect of the present invention, combinations of the above measures may be employed.

In addition, the term "and/or" herein is just an association relation that describes the associated objects, and it indicates that there may be three relations. For example, A and/or B may indicate the following three conditions: A is existed separately, A and B are existed at the same time, and B is existed separately. In addition, the character "/" generally indicates that the relation between the associated objects is "or".

FIG. 1 is a flowchart of a group managing method provided by an embodiment of the present invention. The executive subject of the group managing method of the embodiment is a PUSH server, which may be a logical function entity, an individual entity or an individual physical entity. In the practical applications, the PUSH server may be provided at the network side together with the Gateway GPRS Support Node (GGSN), or independent from the GGSN and connected thereto. As illustrated in FIG. 1, the group managing method of the embodiment may include the following contents.

100: allocating a first group identifier to a user group in an Application Server (AS).

Specifically, each user group in the AS is allocated with a group identifier, and different user groups in the AS are allocated with different group identifiers. For example, each user group in the AS is allocated with a first group identifier, so that each user group in the AS has a first group identifier that uniquely identifies the group.

101: acquiring, according to a first identifier of a user joining the group corresponding to the first group identifier, parameter information of the user.

In which, the parameter information of the user includes a second identifier of the user, location information of a UE corresponding to the user, and an identifier indicating whether the user enables reception of PUSH notification. For example, the first and second identifiers may be the same as or different from each other. For example, the first identifier herein may be a private IP of the user, a Temporary Mobile Subscriber Identity (TMSI), a Packet-TMSI (P-TMSI) or a user name, wherein the private IP may be an IP of the user in a Public Land Mobile-communication Network (PLMN). The second identifier may be a TMSI, a P-TMSI or an International Mobile Subscriber Identity (IMSI). When the first identifier is a private IP or a user name, corresponding second identifier may be an IMSI of the user, and if the user has been activated in a core network, corresponding second identifier may also be a TMSI or a P-TMSI. Similarly, when the first identifier is a TMSI or a P-TMSI, corresponding second identifier may be an IMSI of the user, and if the user has been activated in the core network, corresponding second identifier may also be a TMSI or a P-TMSI. In which, the IMSI of the user is an identification code for uniquely identifying the user in the mobile network.

In the embodiment, the identifier indicating whether the user enables reception of PUSH notification means that when there is an updated group message in the group, the PUSH server sends the group message to the user in the group through a PUSH mechanism. When the reception of PUSH notification is enabled, the user can receive the group message of itself in the group in the AS forwarded by the PUSH server, and when the reception of PUSH notification is disenabled, the user cannot receive the group message of itself in the group in the AS forwarded by the PUSH server.

102: a PUSH server establishes a group-based transmission bearer with a core network node.

In which, the core network node is a GGSN or a Serving GPRS Support Node (SGSN). For example, when the PUSH server is integrated with the GGSN, it can be understood that the PUSH server integrates all the functions of the GGSN, and then the core network node is regarded as the SGSN. When the PUSH server and the GGSN are provided separately, the core network node may be deemed as the SGSN.

103: the PUSH server creates a group context corresponding to the first group identifier, wherein the group context includes the parameter information of the user in the group and information of the transmission bearer.

For example, in the embodiment, 100 specifically may represent a first group identifier pre-allocated to a group in the AS before the PUSH server creates any group in the AS, a first group identifier allocated by the PUSH server to a group created in the AS when a first user joins the group, or a first group identifier allocated by the PUSH server to a group created in the AS when the AS sends to the PUSH server a request for allocating a group identifier to the group when the number of users enabling the reception of PUSH notification exceeds a predetermined threshold. For example, the first group identifier may include two parts, such as an identifier (e.g., ID) and a group identifier (group ID) of the Public Land Mobile-communication Network (PLMN). In which, the group identifier may be an identifier corresponding to the group in the AS, and it may be called as a second group identifier so as to be distinguished from the first group identifier in the PUSH server. The first group identifier is a unique identifier used in the mobile network and transmitted at the air interface, and the second group identifier is an identifier used by the UE in the AS.

In the embodiment, the location information of the UE corresponding to the user may be route area information or location area information of the UE, e.g., the address or identifier of the GGSN and the SGSN corresponding to the UE, provided that the UE corresponding to the user can be accurately located through the route area information or the location area information.

The managing method based on group PUSH mechanism in the embodiment allocates a first group identifier to a group in an AS; acquires, according to a first identifier of a user joining the group, parameter information of the user, wherein the parameter information of the user includes a second identifier of the user, location information of a UE corresponding to the user, and an identifier indicating whether the user enables reception of PUSH notification; establishes a group-based transmission bearer with a GGSN; and creates group context corresponding to the first group identifier, wherein the group context includes parameter information of the user in the group and information of the transmission bearer. Through the technical solution of the embodiment, a uniform management of users in the same group in the AS can be performed according to the created group context, which solves the defect in the prior art that users in the same group cannot be managed uniformly based on groups in the AS and effectively improves the group management efficiency.

To be noted, on the basis of the above technical solution, preferably, before step 100 of the embodiment, the group managing method may include setting, in the PUSH server, a predetermined threshold of the number of users enabling reception of PUSH notification. The PUSH server may detect the number of users enabling reception of PUSH notification in the group and compare it with the predetermined threshold, and steps 100 to 103 are performed when it is determined that the number of users enabling reception of PUSH notification in the group reaches the predetermined threshold.

In the above solution, the PUSH mechanism will not be started unless the number of users enabling reception of PUSH notification in the group reaches the predetermined threshold, thereby preventing the PUSH mechanism from being started when there are only a small number of users in the group, and avoiding the resource waste.

To be noted, following step 100 of the embodiment, the PUSH server may establish a mapping relation between the first group identifier and a second group identifier corresponding to the group in the AS, after allocating the first group identifier to the group in the AS. Thus, for example when the AS sends a joining request of the user to the PUSH server, the joining request may include the IP address of the user and the second group identifier, and the PUSH server can acquire that the user joins the group corresponding to the first group identifier according to the mapping relation between the first group identifier and the second group identifier.

Between steps 100 and 101 of the embodiment, the group managing method may further include: the PUSH server detects that the user joins the group in the AS.

In which, the PUSH server may specifically detect the joining request of the user for joining the group in the AS in the following three modes:

1) The PUSH server receives from the AS a joining request that carries the second group identifier or the first group identifier corresponding to the group joined by the user, and the IP address of the user.

Such type of joining request indicates that the user has successfully joined the group in the AS, and at that time, the joining request sent from the AS to the PUSH server carries the public IP of the user.

2) The PUSH server directly receives from the UE a joining request that carries the second group identifier or the first group identifier corresponding to the group joined by the user, and the IP address of the user.

In that case, the UE may directly communicate with the PUSH server, i.e., it can be deemed that a PUSH Client is provided in the UE. The PUSH Client in the UE may directly communicate with the PUSH server. After the user corresponding to the UE successfully joins the group in the AS, the UE may directly send to the PUSH server a joining request that carries a first identifier of the user, and a second group identifier of the group in the AS joined by the user or a first group identifier corresponding to the second group identifier in the PUSH server. In the embodiment, the identifier of the user may be private IP, TMSI or P-TMSL of the user in the PLMN.

3) The PUSH server parses a joining request sent from the GGSN to the AS, wherein the joining request carries a second group identifier or a first group identifier corresponding to the group joined by the user, and the IP address of the user.

In that case, the identifier of the user may be private IP, TMSI or P-TMSL of the user in the PLMN. Preferably, after parsing the joining request sent from the GGSN to the AS, the PUSH Sever may further parse a joining response sent from the AS to the GGSN, wherein the joining response carries a first identifier of the user and corresponding second group identifier or first group identifier of the group joined by the user, and in that case, the first identifier of the user may be the public IP of the user.

Correspondingly, the PUSH server may parse the joining request of the user sent from the GGSN to the AS, and the joining response returned by the AS to the GGSN. After parsing the joining response, the PUSH server may detect and acquire the joining request of the user for joining the group between steps 100 and 101 of the embodiment. Next, the PUSH server may add corresponding parameter information of the user to the group context of the PUSH server according to the joining request of the user.

When the GGSN and the PUSH server are provided separately, the core network node includes the GGSN and the SGSN. In that case, in step 101 of the above embodiment, acquiring, according to the first identifier of the user joining the group, the parameter information of the user specifically may include: the PUSH server acquires, according to the first identifier of the user joining the group, the parameter information of the user from the GGSN, the SGSN, a Home Subscriber Server (HSS) or a Home Location Register (HLR).

Figure 2:
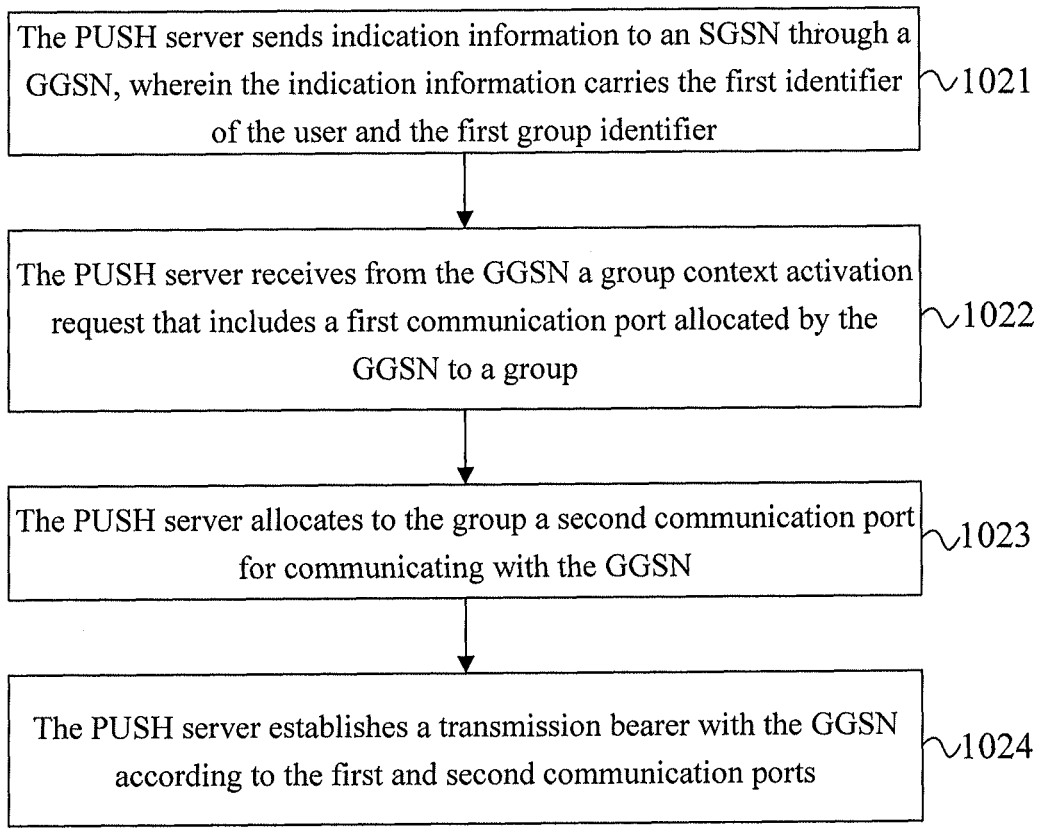
FIG. 2 is a flowchart of a group managing method provided by another embodiment of the present invention.

FIG. 2 is a flowchart of a group managing method provided by another embodiment of the present invention. As illustrated in FIG. 2, the group managing method of the embodiment is based on the embodiment corresponding to FIG. 1, and the core network node includes the GGSN and the SGSN, wherein step 102 "establishing a group-based transmission bearer with the GGSN" specifically may include the following contents:

1021: the PUSH server sends indication information to the SGSN through the GGSN, wherein the indication information carries a first identifier of the user and a first group identifier.

For example, the indication information is used to indicate the SGSN to notify users in the group to activate group context corresponding to the first group identifier. For example, the indication information indicating the SGSN to notify the users to activate the group context may be sent to the UE corresponding to the user having the first identifier through a Radio Network Controller (RNC) and a NodeB.

1022: the PUSH server receives from the GGSN a group context activation request that includes a first communication port allocated by the GGSN to the group.

For example, the group context activation request is sent from the GGSN upon a created group context activation request sent from the SGSN, the created group context activation request being sent from the SGSN upon a group context activation request sent from the UE.

1023: the PUSH server allocates to the group a second communication port for communicating with the GGSN.

For example, the second communication port allocated by the PUSH server to the group for communicating with the GGSN is corresponding to the first communication port, so as to subsequently transmit a group message corresponding to the first group identifier between the PUSH server and the GGSN, according to the second communication port and the first communication port, i.e., to realize a group-based communication between the PUSH server and the GGSN.

1024: the PUSH server establishes a transmission bearer with the GGSN according to the first and second communication ports.

For example, group-based transmission bearers are established between the GGSN and the SGSN, the SGSN and the RNC in addition to the PUSH server and the GGSN.

When receiving a notification to activate the group context, the UE sends a group context activation request to the SGSN, then the SGSN creates a group context according to the received group context activation request, and sends a created group context activation request to the GGSN, while the GGSN creates a group context after receiving the created group context activation request sent from the SGSN. Next, the GGSN sends a group context activation request to the PUSH server to notify it that the UE has sent the group context activation request. In which, the request sent from either the SGSN or the GGSN to the parent node carries a communication port allocated to the group for communicating with the parent node. Correspondingly, after receiving the group context activation request, the PUSH server returns a group context activation response to the GGSN, and the GGSN then returns the group context activation response to the SGSN. After receiving the group context activation response, the SGSN establishes a group-based Radio Access Bearer (RAB) with the RNC to subsequently transmit the group message. In addition, the SGSN also returns the group context activation response to the UE to notify it that the group context activation request is successful.

In which, each node among the PUSH server, the GGSN, the SGSN and the RNC feeds back to corresponding child node that the group context activation response carries a communication port allocated by the current node to the group for communicating with the child node. In which, the group context activation request initiated by the UE specifically may be a Packet Data Protocol (PDP) group context activation request. Thus the uplink communication port and the downlink communication port can be obtained in the GGSN and the SGSN, so as to establish the transmission bearers between the GGSN and the SGSN in addition to the SGSN and the RNC.

Through the above technical solution, the group managing method of the embodiment can establish a group-based transmission bearer between the PUSH server and the GGSN, so as to subsequently transmit corresponding group message of the group between the PUSH server and the GGSN, and send the group message to each UE under the SGSN in the group through the transmission bearer once for all. The technical solution of the embodiment can effectively improve the group management efficiency at the network side.

To be noted, after step 103 of the above embodiment, it may further require updating corresponding group context of the group. For example, when a UE joins the group, a UE exits the group, a UE logs out the group, a UE is temporarily powered off, a UE disenables reception of PUSH notification originally enabled, or a UE enables reception of PUSH notification originally disenabled, etc. In that case, the following steps may be included:

a) The PUSH server receives an update request that carries a first identifier of a UE to be updated, wherein the first identifier of the UE may be IP address, P-TMSI, TMSI or user name, meanwhile, a second or first group identifier is also carried.

b) Updating parameter information of the UE to be updated in the group context corresponding to the first group identifier, according to the update request.

When the update request carries the second group identifier, the PUSH server may acquire corresponding first group identifier according to the mapping relation between the first and second group identifiers, and then update the parameter information of the UE to be updated in the group context corresponding to the first group identifier.

The update request may be received by the PUSH server from the AS or the GGSN, or directly from the UE corresponding to the user. The update request may be a joining request added by the user, and in that case, the parameter information of the user is correspondingly added to the group context. The update request may also be an exiting request of the user for application logout, group exiting or power off. Correspondingly, the PUSH server deletes the parameter information of the user from the group context, otherwise a state of powered off, application logged out or group exited may be set to represent the user's state. The update request may also modify an identifier indicating whether the user enables reception of PUSH notification, and in that case, corresponding PUSH server modifies the identifier indicating whether the user enables reception of PUSH notification in the group context.

The PUSH server may acquire a second identifier of the user according to the first identifier of the user in the update request (refer to the above embodiment for the details), and then update the parameter information of the user to be updated corresponding to the second identifier, in the group context corresponding to the first group identifier.

To be noted, when the update request is received by the PUSH server from the AS or the GGSN, the update request may also carry the second identifier of the UE.

In which, if the PUSH server deletes the parameter information of the user corresponding to the UE, the process of application logout, group exiting or power off of the user corresponding to the UE may also be deemed as a deactivation process of the group. In correspondence to the activation process, the deactivation process of the group context may be triggered through an interaction between the PUSH server and the AS or the UE corresponding to the user after the UE interacts with the AS. If related information of the user is not to be deleted, a state of powered off, application logged out or group exited may be set to represent the user's state, and this process may be deemed as the update process of the group. The update process of the group context may be triggered through an interaction between the PUSH server and the AS or the UE corresponding to the user after the UE interacts with the AS.

When the UE corresponding to the user is powered on or the route area is updated, the UE may send the location information to the Push Server, and the PUSH server may update the location information of the UE corresponding to the user in the group. In that case, it can be deemed that a PUSH Client is provided in the UE, and the UE may send its updated route area information (also referred to as route location information) to the PUSH server in the process of a direct communication with the PUSH server. Or, after the user powers on or the route area is updated, corresponding SGSN sends the route location information of the user, such as SGSN address, SGSN identifier or GGSN address, to the PUSH server when the user corresponding to the UE completes the Attach registration or during or after the route update process. Finally, the PUSH server updates the location information of the UE corresponding to the user in the group context according to the updated route area information of the UE, so as to ensure the accuracy of the information in the group context. To be noted, in the Route Area Update (RAU) process, the new SGSN corresponding to the UE in the idle state notifies the PUSH server to update the location information of the UE in the group context, such as a Route Area Identity (RAI)/Location Area Identity (LAI) of the group to which the UE belongs, so as to determine the cell or RNC of the PUSH group message to be sent subsequently.

The UE may be switched in the same SGSN (i.e., Intra-SGSN) between different RNCs (i.e., Inter-RNC). In the locating process of the UE, the SGSN indicates the target RNC after the switching to initiate an establishment of the group PUSH bearer. Meanwhile, the SGSN needs to update the parameter information of the UE and the information of the transmission bearer in the group context established on the SGSN.

The UE may be switched between different SGSNs (i.e., Inter-SGSN) and different RNCs (i.e., Inter-RNC). In that case, a source SGSN transmits group context information related to the UE in the group context to a target SGSN, and the target SGSN indicates the RNC to initiate an establishment of the group PUSH bearer. After the switching, the target SGSN updates the group bearer with the GGSN, the SGSN notifies the PUSH server, and the PUSH server further updates the RAI of the UE concerned in the group context in the PUSH server. Meanwhile, the target SGSN needs to update the parameter information of the UE and the information of the transmission bearer in the group context established on the target SGSN, so as to adequately ensure the accuracy of information in the group context of each SGSN, and ensure that the PUSH group message is ready to be sent subsequently.

In the above embodiments, the technical solutions of the present invention are all described through examples where the user joins a certain group in the AS. But in the practical applications, the user may also simultaneously join multiple groups in the AS according to the implementations of the above embodiments.

To be noted, in steps 102 to 104 of the previous embodiment, the transmission bearer between the PUSH server and the GGSN, the GGSN and the SGSN, or the SGSN and the RNC may be established on the following occasions:

1) when the PUSH server determines that a user joins the group;

2) when the PUSH server determines that the number of users in the group reaches a threshold;

3) when the PUSH server determines to establish/activate a group;

4) when the PUSH server receives a PUSH message from the AS; and 5) when the AS notifies the PUSH server to establish a bearer connection.

A transmission bearer based on the application type (e.g., Access Point Name (APN)), a transmission bearer based on a determined group, or a transmission bearer shared by all the groups may be established between the PUSH server and the GGSN, the GGSN and the RNC, or the SGSN and the RNC. When an established transmission bearer needs to be applied to other newly jointed group, it only requires recording the transmission bearer in the group context corresponding to the newly jointed group. Of course, other manners may be used to indicate that the newly established transmission bearer is applicable to all the groups in the practical applications.

If the transmission bearer between the PUSH server and the GGSN is established based on all the groups, the Push Server may indicate the first group identifier at the packet head of the downlink packet. When establishing a group Radio Access Bearer (RAB), the SGSN may send to the RNC the first group identifier, the first identifier of the user, or the number of users in one group, and such information may be put in the group context established at each node. A common bearer may be established between the RNC and the NodeB. The NodeB is provided with a notification indication physical channel, a list of bearer group identifiers, a common logical channel of a bearer notifying message, and corresponding common transmission channel and physical channel. In this example, the user joins one group, and when the user simultaneously joins multiple groups, the transmission bearer between the nodes in the embodiment of the present invention may be established in two manners.

A) The SGSN and the GGSN/RNC may establish a common transmission bearer for all the groups. The PUSH server indicates the group identifier in the downlink packet, and establishes an IP connection with the GGSN/AS. A connection of GPRS Tunneling Protocol for the user plane (GTP-U) may also be established between the PUSH server and the GGSN. The PUSH server has the IP addresses of the public network and the private network. The format of a data packet that carries the group identifier is defined for the interaction between the AS and the PUSH server. The format of a signaling packet (e.g., signaling indicating to allocate the group identifier, signaling indicating the user to join the group, signaling indicating the user to exit the group, and signaling indicating to stop receiving the PUSH message) is defined for the interaction between the AS and the PUSH server. To be noted, in the practical applications, a permanent correspondence connection may be established between each PUSH server and an AS, e.g., the address of the PUSH server may be configured in the AS. When the network corresponding to an operator includes a plurality of PUSH servers, the mapping relation between the PUSH server and the address of the UE corresponding to the user may be configured in the AS, and the AS may determine a PUSH server corresponding to the address of the UE corresponding to the user according to the mapping relation.

A user-level-based GTP-U user plane is established between the SGSN and the GGSN/RNC, including the interaction of Tunnel Endpoint Identifier (TEID) of the address and application type between the user plane nodes. A common RAB bearer group message may be established between the SGSN and the RNC, and a common tunnel may be established for the user plane between the RNC and the GGSN. The RNC and the RNC may also establish a common RAB bearer and corresponding common channel for an application type (QQ, Twitter, etc.), e.g., based on an Access Point Name (APN), or establish a group context and a common transmission bearer tunnel for all the groups.

B) The SGSN and the GGSN/RNC may establish a transmission bearer for each group context, respectively, and establish a transmission bearer tunnel and an RAB for each group context, respectively, wherein the GGSN or the SGSN does not need to indicate the group identifier in the downlink packet.

In the RNC, through broadcasting, the channel configuration indicated by the group notification may be performed and the channel configuration of the group list may be issued. The channel configuration may be performed when the RNC receives from the SGSN a message for establishing a group RAB or it receives a downlink group message, or the RNC counts that the users of a certain group reaches a predetermined threshold. The RNC calculates the bit indicated by the notification according to the group identifier, and notifies the NodeB of a group identifier list for sending the group message in the notification indication channel and other indication channel of the group. In addition, the RNC also indicates a sending time for the NodeB to send the group message, and the sending time may be a certain timing or period. Thus, the NodeB can send the group message according to the notification of the RNC.

When the number of users in the group reaches a certain threshold, the RNC sends a PUSH group message, and when the threshold is not reached, the user may be indicated through a normal broadcasting or a dedicated signaling to stop receiving the PUSH message, and establish a point-to-point bearer to receive the group message.

Correspondingly, on the side of the UE corresponding to the user, a group PDP context may be established for all the groups. In that case, it can be deemed that the UE is provided with a client that supports reception of PUSH message, and whether to enable reception of PUSH message may also be configured. For example, the client may interact with the PUSH server or the AS, and configure whether to receive the PUSH message. After activating the group context, the UE monitors the notification indication channel and the notification control channel according to the group identifier of the group context, determines whether there is any group message to be received, and further receives the group message in the notification transmission channel. The notification transmission channel is used to transmit the PUSH message, i.e., the data content to be transmitted. The notification control channel is used to transmit the first group identifier. Of course, the UE may determine whether there is any group message to be received based on other channel, such as the high-speed shared control channel and further receive the group message in the data channel, or directly receive the data packet and determine whether there is any group message to be received based on the data packet of the user plane.

In conclusion, after a transmission bearer is established from the UE to the PUSH server, a group context shall be established on each node of the GGSN, the SGSN and the RNC, so as to effectively manage the PUSH server to send a group message to each UE in the group. The group context established on each node includes the parameter information of the UE (referring to the parameter information of the UE in the group context established in the PUSH server), and the information of the transmission bearer through which the path of the PUSH message to be sent can be acquired. Preferably, the RNC and the SGSN may not need to store the IP address of the UE.

Figure 3:
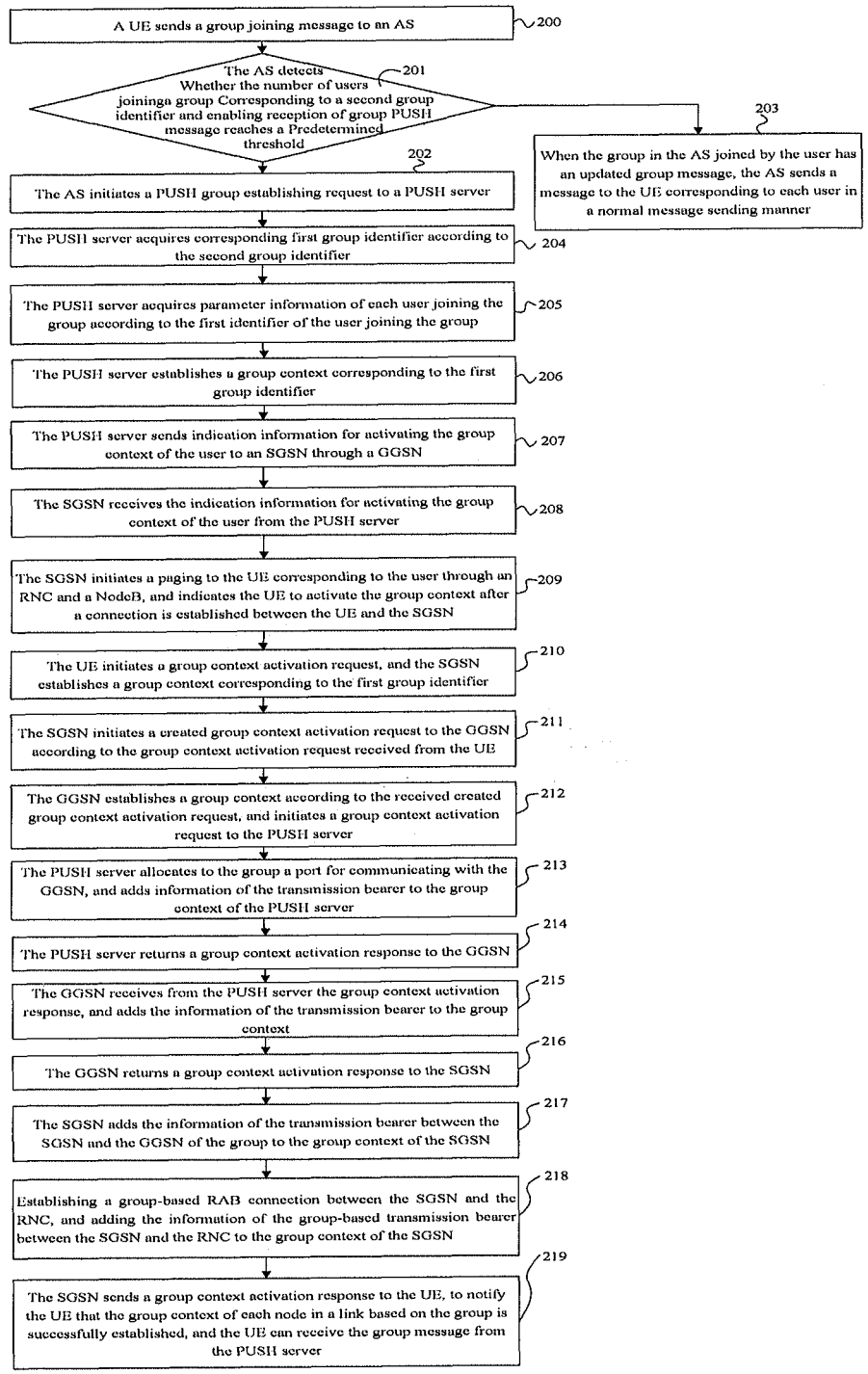
FIG. 3 is a flowchart of a managing method based on a group PUSH mechanism provided by still another embodiment of the present invention.

FIG. 3 is a flowchart of a managing method based on a group PUSH mechanism provided by still another embodiment of the present invention. As illustrated in FIG. 3, the managing method based on the group PUSH mechanism of the embodiment specifically may include the following contents.

200: a UE sends a group joining message to an AS.

The group joining message includes a first identifier of a user corresponding to the UE and a second group identifier corresponding to a group in the AS to be joined by the user. In addition, when receiving the group joining message, the AS may return a group joining response message to the UE.

201: the AS detects whether the number of users joining the group corresponding to the second group identifier and enabling reception of group PUSH message reaches a predetermined threshold; if yes, performing step 202, otherwise performing step 203.

202: the AS initiates a PUSH group establishing request to a PUSH server, and then step 204 is to be performed.

The PUSH group establishing request includes the second group identifier and the first identifier of the user joining the group.

203: when the group in the AS joined by the user has an updated group message, the AS sends a message to the UE corresponding to each user in a normal message sending manner, and please refer to the prior art for the details.

204: the PUSH server acquires corresponding first group identifier according to the second group identifier.

For example, the PUSH server may acquire the first group identifier corresponding to the second group identifier according to the stored table of mapping relation between the first group identifier and the second group identifier.

205: the PUSH server acquires the parameter information of each user joining the group according to the first identifier of the user joining the group.

For example, the PUSH server may acquire the parameter information of each user in the group through an interaction with the GGSN, the SGSN, the HSS or the HLR. Please refer to the descriptions of the above related embodiments for the details of the parameter information of the user.

206: the PUSH server establishes a group context corresponding to the first group identifier.

207: the PUSH server sends indication information for activating the group context of the user to an SGSN through a GGSN.

208: the SGSN receives the indication information for activating the group context of the user from the PUSH server.

209: the SGSN initiates a paging to the UE corresponding to the user through an RNC and a NodeB, and indicates the UE to activate the group context after a connection is established between the UE and the SGSN.

In which, the activated group context of the UE carries the first group identifier corresponding to the group in the AS joined by the user corresponding to the UE.

210: the UE initiates a group context activation request, and the SGSN establishes a group context corresponding to the first group identifier and including a second identifier of the user corresponding to the UE.

211: the SGSN initiates a created group context activation request to the GGSN according to the received group context activation request sent from the UE.

In which, the created group context activation request carries the second identifier of the user, and a port (e.g., a first TEID) allocated by the SGSN to the group for communicating with the GGSN.

212: the GGSN establishes a group context including the parameter information of the user according to the received created group context activation request, and initiates a group context activation request carrying a port of the GGSN for communicating with the PUSH server to the PUSH server.

After receiving the created group context activation request, the GGSN allocates a second TEID for communicating with the SGSN. Meanwhile, the transmission protocol between the GGSN and the PUSH server shall be further determined, and when it is a GDP-U-based transmission protocol, the GGSN shall allocate to the group a third TEID for communicating with the PUSH server. When the transmission protocol between the GGSN and the PUSH server is an IP protocol, the GGSN shall allocate to the group a first IP port for communicating with the PUSH server.

In which, the group context activation request initiated by the GGSN to the PUSH server carries a port of the GGSN for communicating with the PUSH server, e.g., the third TEID or the first IP port.

213: after receiving the group context activation request, the PUSH server allocates to the group a port for communicating with the GGSN, and adds the information of the transmission bearer to the group context of the PUSH server.

For example, when the transmission protocol between the GGSN and the PUSH server is a GDP-U-based transmission protocol, the PUSH server shall allocate to the group a port for communicating with the GGSN, such as a fourth TEID corresponding to the third TEID. When the transmission protocol between the GGSN and the PUSH server is an IP protocol, the port allocated by the PUSH server to the group for communicating with the GGSN may be a second IP port corresponding to the first IP port. Next, the PUSH server carries the fourth TEID or the second IP port in the group context activation response returned to the GGSN. In that case, the PUSH server may establish a mapping relation between the third and fourth ports, or a mapping relation between the first and second IP ports, so as to record the transmission bearer between the PUSH server and the GGSN of the group in the group context.

214: the PUSH server returns a group context activation response to the GGSN.

215: the GGSN receives from the PUSH server the group context activation response that carries the port allocated by the PUSH server to the group for communicating with the GGSN, and adds the information of the transmission bearer to the group context.

After receiving from the PUSH server the group context activation response, the GGSN may establish a mapping relation between the third and fourth ports, or a mapping relation between the first and second IP ports, so as to record the transmission bearer between the GGSN and the PUSH server of the group in the group context.

216: the GGSN returns a group context activation response to the SGSN.

217: the SGSN receives from the GGSN the group context activation response that carries a second TEID allocated by the GGSN to the group for communicating with the SGSN, and adds the information of the transmission bearer between the SGSN and the GGSN of the group to the group context of the SGSN.

In which, the details of the second TEID have been described in step 212.

For example, after receiving the group context activation response, the SGSN can establish a mapping relation between the first and second TEIDs, and record the transmission bearer between the SGSN and the GGSN of the group in the group context

218: establishing a group-based RAB connection between the SGSN and the RNC, and adding the information of the group-based transmission bearer between the SGSN and the RNC to the group context of the SGSN.

To be noted, the process of establishing a group-based RAB connection between the SGSN and the RNC herein is the same as that of establishing a normal RAB connection between the SGSN and the RNC in the prior art, please refer to related prior art for the details. The difference only lies in that the RAB connection between the SGSN and the RNC in the embodiment is shared based on a group.

219: the SGSN sends a group context activation response to the UE, to notify the UE that the group context of each node in a link based on the group is successfully established, and the UE can receive the group message from the PUSH server.

The above steps of the embodiment are described through an example where the group context is established on each node for the first time. The group context established on each node of the PUSH server, the GGSN, the SGSN and the RNC includes two parts: the parameter information of the user, and the information of the transmission bearer established for the group message to be transmitted. In that case, based on such network architecture, the PUSH server may manage the users joining the groups in the AS on a group basis, and send the message of a group in the AS to UEs under the group at one time based on the group.

In a group of the AS corresponding to the second group identifier, when the location of a user changes, a user joins or exits, or an identifier of a user indicating whether to enable reception of PUSH notification changes, a UE corresponding to the user may initiate an update request to the PUSH server, so as to update related information in the group context. Please refer to the descriptions of related method embodiments for the details, so as to synchronize the group contexts on respective nodes.

The technical solution of the embodiment solves the defect in the prior art that the users in the same group cannot be managed uniformly at the network side based on the groups in the AS, performs a uniform management of the users in the same group in the AS, and improves the group management efficiency.

Figure 4:
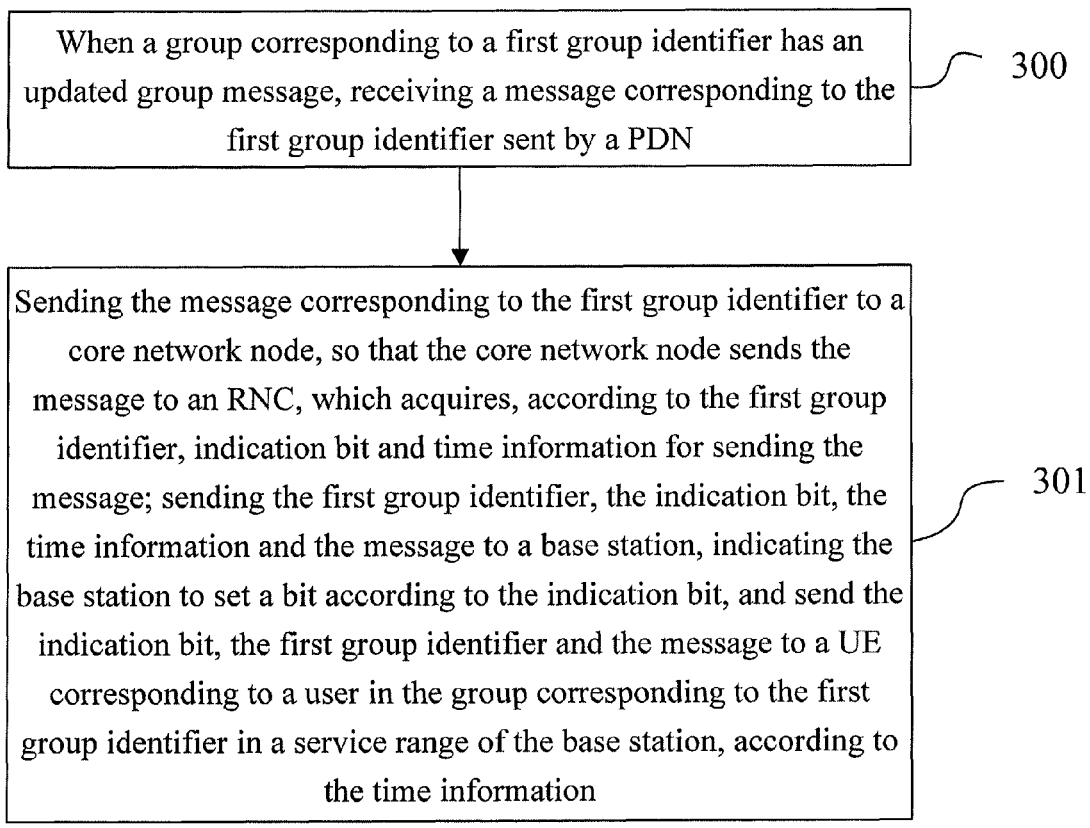
FIG. 4 is a flowchart of a method for processing group message provided by an embodiment of the present invention.

FIG. 4 is a flowchart of a method for processing group message provided by an embodiment of the present invention. As illustrated in FIG. 4, the executive subject of the method for processing group message of the embodiment is a PUSH server. As illustrated in FIG. 4, the method for processing group message of the embodiment specifically may include the following contents.

300: when a group corresponding to a first group identifier has an updated group message, receiving a message corresponding to the first group identifier sent from a Public Data Network (PDN).

In which, the message is the updated group message or a group message notification. In the embodiment, the application scenario where the message is the group message notification is that when the group corresponding to the first group identifier has the updated group message, the PDN does not need to directly send the updated group message to the PUSH Server, instead, it sends a notification, i.e., the group message notification, to the PUSH Server, so as to notify the PUSH Server that the group corresponding to the first group identifier has an updated message, and if a UE subsequently wants to view the updated message, the UE shall acquire the updated message by itself. In the embodiment, the PDN is the network where the AS is located except the mobile network where the PUSH Server is currently located. The PDN is provided with various AS. For example, receiving the message corresponding to the first group identifier sent from the PDN specifically may be receiving the message corresponding to the first group identifier sent from the AS in the PDN.

301: sending the message corresponding to the first group identifier to a core network node, so that the core network node sends the message to an RNC, which acquires, according to the first group identifier, indication bit and time information for sending the message; sending the first group identifier, the indication bit, the time information and the message to a NodeB, indicating the NodeB to set a bit according to the indication bit, and sending the indication bit, the first group identifier and the message to a UE corresponding to a user in the group corresponding to the first group identifier in a service range of the NodeB, according to the time information.

In the embodiment, the core network node is an SGSN, or a GGSN and the SGSN. When the PUSH server is integrated with the GGSN, the core network node herein may be regarded as the SGSN. When the PUSH server and the GGSN are provided separately, the core network node herein includes the GGSN and the SGSN. In that case, "sending a core network node the message corresponding to the first group identifier, so that the core network node sends the message to an RNC" in step 301 specifically may be sending to the GGSN the message corresponding to the first group identifier, so that the GGSN sends the message to the RNC through the SGSN.

In the embodiment, the RNC acquires the indication bit and the time information of the sent message according to the first group identifier, wherein the indication bit may be acquired using a calculation method for notifying the indication bit in the Multimedia Broadcast Multicast Services (MBMS), by replacing the identifier of the TMGI with the first group identifier. In addition, other parameters in the calculation method for notifying the indication bit may also be deleted or adjusted in sizes.

In the embodiment, the time information may be a time point or a time segment. In which, the RNC may calculate the time information according to the first group identifier and a DRX cycle length received in advance. The DRX cycle length represents discontinuous reception factor parameter. The DRX cycle length may be broadcasted to the UE via the system message in advance, and in practical application, it may be considered to allocate a DRX cycle length to all UEs in one group. The RNC may calculate the time information according to a function: Notification Occasion=F (first group identifier, DRX cycle length). The specific calculation method may employ the UE paging occasion, and corresponding time information is acquired by replacing the IMSI with the first group identifier. Upon demand, sizes of other parameters may be adjusted, or some parameters may be deleted.

In the method for processing group message of the embodiment, when a group corresponding to the first group identifier has an updated group message, the PUSH server receives from the PDN a message corresponding to the first group identifier, wherein the message may be the updated group message or a group message notification, then sends the message corresponding to the first group identifier to a core network node, so that the core network node sends the message to an RNC, which acquires, according to the first group identifier, indication bit and time information for sending the group message. The PUSH server sends the first group identifier, the indication bit, the time information and the message to the NodeB, indicates the NodeB to set a bit according to the indication bit, and send the indication bit, the first group identifier and the message to a UE corresponding to a user in the group corresponding to the first group identifier in a service range of the NodeB, according to the time information. Through the technical solution of the embodiment, a group message or a group message notification may be sent to the UEs in a group of the AS on a group basis when the group has an updated message. In addition, the group message or the group message notification only needs to be sent to the UEs in the same group for one time, rather than being sent to different UEs respectively for multiple times in the prior art, thus the efficiency for the AS to send a message to each UE in the group can be effectively improved.

Figure 5:
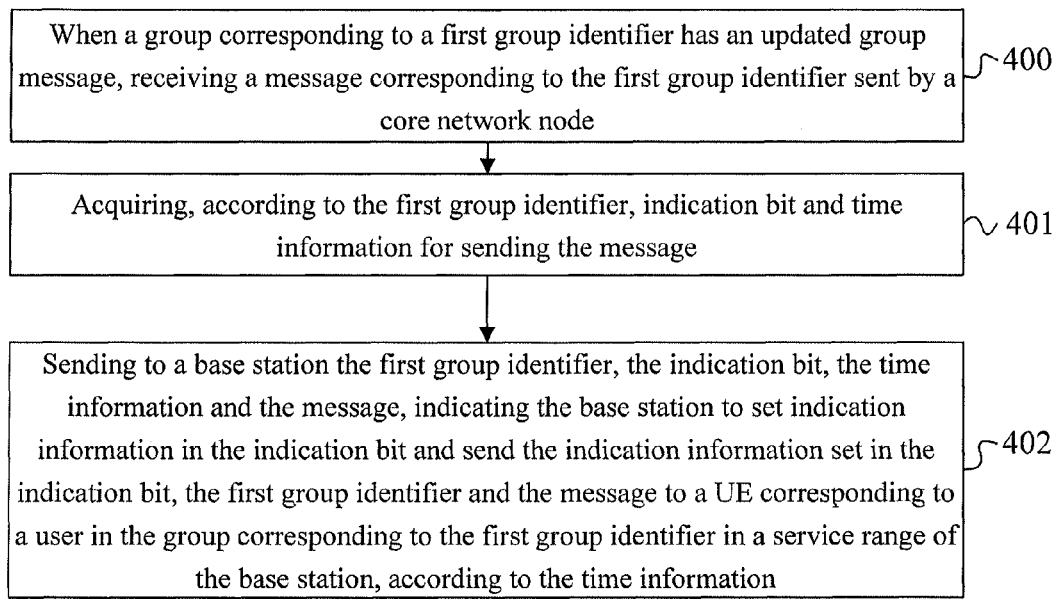
FIG. 5 is a flowchart of a method for processing group message provided by another embodiment of the present invention.

FIG. 5 is a flowchart of a method for processing group message provided by another embodiment of the present invention. As illustrated in FIG. 5, the executive subject of the method for processing group message of the embodiment is an RNC. As illustrated in FIG. 5, the method for processing group message of the embodiment specifically may include the following contents.

400: when a group corresponding to a first group identifier has an updated group message, receiving a message corresponding to the first group identifier sent from a core network node.

The message is the updated group message in the group corresponding to the first group identifier or a group message notification. In the embodiment, the core network node is the SGSN.

401: acquiring, according to the first group identifier, indication bit and time information for sending the message.

402: sending to a NodeB the first group identifier, the indication bit, the time information and the message, indicating the NodeB to set indication information in the indication bit, and to send the indication information set in the indication bit, the first group identifier and the message to a UE corresponding to a user in the group corresponding to the first group identifier in a service range of the NodeB, according to the time information.

In the method for processing group message of the embodiment, when a group corresponding to the first group identifier has an updated group message, a message corresponding to the first group identifier is received from a core network node such as the SGSN; indication bit and time information for sending the group message is acquired according to the first group identifier; the first group identifier, the indication bit, the time information and the message are sent to the NodeB, which is indicated to set indication information in the indication bit, and the indication information set in the indication bit, the first group identifier and the message are sent to a UE corresponding to a user in the group corresponding to the first group identifier in a service range of the NodeB, according to the time information. Through the technical solution of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

To be noted, when the PUSH Server and the GGSN are provided separately, the transmission bearer between the PUSH Server and the GGSN may be established based on one certain group or all the groups. For the specific way of establishing the transmission bearer, please refer to the description of related embodiment of the group managing method, and herein is omitted.

When the transmission bearer between the PUSH Server and the GGSN is established based on one certain group, "sending the message corresponding to the first group identifier to a core network node" in step 301 specifically may be sending, by the PUSH Server, the message corresponding to the first group identifier to the GGSN through a transmission bearer between the PUSH Server and the GGSN established for the group corresponding to the first group identifier.

When the transmission bearer between the PUSH Server and the GGSN is established based on all the groups, "sending the message corresponding to the first group identifier to a core network node" in step 301 specifically may be sending, by the PUSH Server, a message carrying the first group identifier to the GGSN through a transmission bearer between the PUSH Server and the GGSN established for all the groups.

Similarly, in the embodiment, a transmission bearer between the GGSN and the SGSN may also be established based on all the groups or one certain group in the same way. Moreover, in the same way, the GGSN sends a message carrying the first group identifier to the SGSN through the transmission bearer established based on all the groups, or the GGSN sends a message carrying the certain group to the SGSN through the transmission bearer established based on one certain group.

Similarly, a message may be sent between the RNC and the SGSN in the same way. A transmission bearer between the RNC and the SGSN may also be established based on all the groups or one certain group in the same way. Moreover, in the same way, the SGSN sends a message carrying the first group identifier to the RNC through the transmission bearer established based on all the groups, or the SGSN sends a message corresponding to the first group identifier to the RNC through the transmission bearer established based on one certain group.

Figure 6:
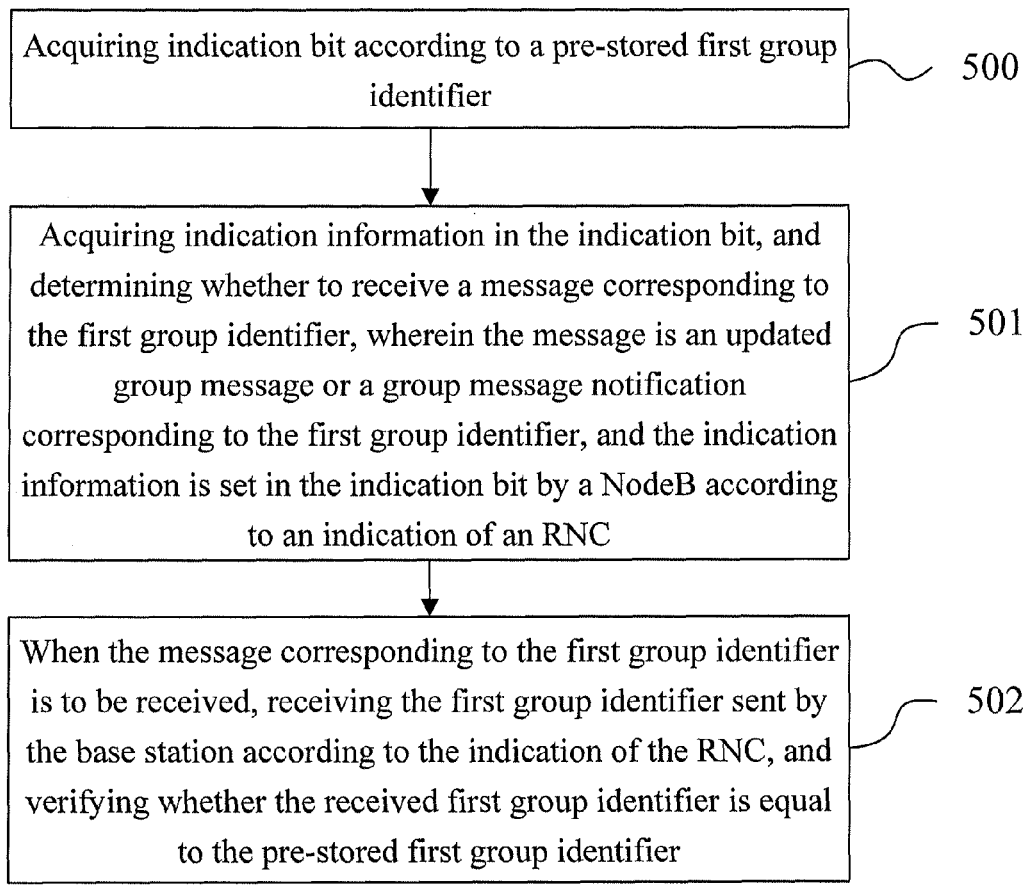
FIG. 6 is a flowchart of a method for processing group message provided by still another embodiment of the present invention.

FIG. 6 is a flowchart of a method for processing group message provided by still another embodiment of the present invention. The executive subject of the method for processing group message of the embodiment is a UE. As illustrated in FIG. 6, the method for processing group message of the embodiment specifically may include the following contents.

500: acquiring indication bit according to a pre-stored first group identifier.

501: acquiring indication information in the indication bit, and determining whether to receive a message corresponding to the first group identifier, wherein the message is an updated group message or a group message notification corresponding to the first group identifier, and the indication information is set in the indication bit by a NodeB according to an indication of an RNC.

502: when the message corresponding to the first group identifier is to be received, receiving the first group identifier sent from the NodeB according to the indication of the RNC, and verifying whether the received first group identifier is same as the pre-stored first group identifier.

503: when the received first group identifier is same as the pre-stored first group identifier, receiving the message sent from the NodeB according to the indication of the RNC.

In the method for processing group message of the embodiment, the UE acquires indication bit according to a pre-stored first group identifier, then acquires indication information in the indication bit, and determines whether to receive a message corresponding to the first group identifier, wherein the message is an updated group message or a group message notification corresponding to the first group identifier, and the indication information is set in the indication bit by a NodeB according to an indication of an RNC. When the message corresponding to the first group identifier is to be received, the UE receives the first group identifier sent from the NodeB according to the indication of the RNC, and verifies whether the received first group identifier is same as the pre-stored first group identifier. When the received first group identifier is same as the pre-stored first group identifier, the UE receives the message sent from the NodeB according to the indication of the RNC. Through the technical solution of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

Figure 7:
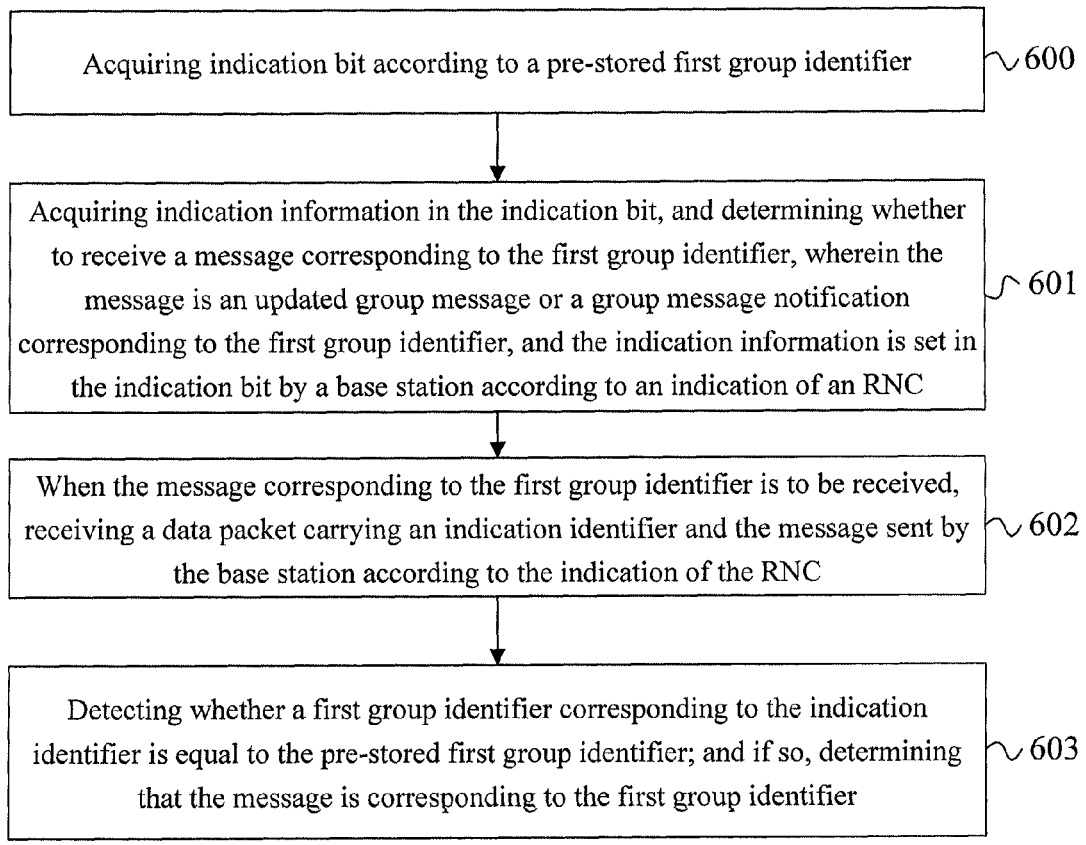
FIG. 7 is a flowchart of a method for processing group message provided by yet another embodiment of the present invention.

FIG. 7 is a flowchart of a method for processing group message provided by yet another embodiment of the present invention. The executive subject of the method for processing group message of the embodiment is a UE. As illustrated in FIG. 7, the method for processing group message of the embodiment specifically may include the following contents.

600: acquiring indication bit according to a pre-stored first group identifier.

601: acquiring indication information in the indication bit, and determining whether to receive a message corresponding to the first group identifier, wherein the message is an updated group message or a group message notification corresponding to the first group identifier, and the indication information is set in the indication bit by a NodeB according to an indication of an RNC.

602: when the message corresponding to the first group identifier is to be received, receiving a data packet carrying an indication identifier and the message sent from the NodeB according to the indication of the RNC.

603: detecting whether a first group identifier corresponding to the indication identifier is same as the pre-stored first group identifier; and if so, determining that the message is corresponding to the first group identifier.

In the method for processing group message of the embodiment, the UE acquires indication bit according to a pre-stored first group identifier, then acquires indication information in the indication bit, and determines whether to receive a message corresponding to the first group identifier, wherein the message is an updated group message or a group message notification corresponding to the first group identifier, and the indication information is set in the indication bit by a NodeB according to an indication of an RNC. When the message corresponding to the first group identifier is to be received, the UE receives a data packet carrying an indication identifier and the message sent from the NodeB according to the indication of the RNC, and detects whether a first group identifier corresponding to the indication identifier is same as the pre-stored first group identifier; and if so, the message is corresponding to the first group identifier. Through the technical solution of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

Figure 8:
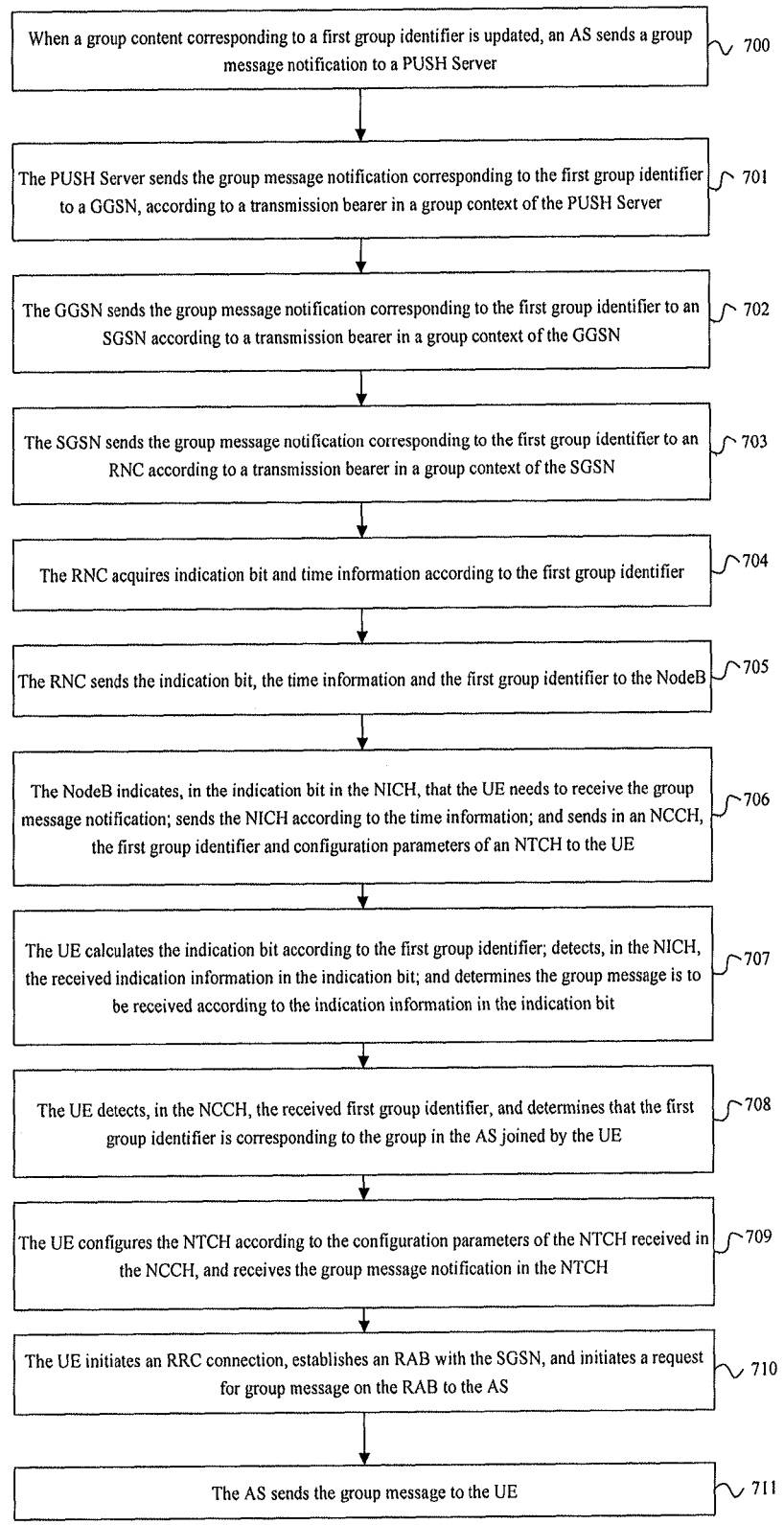
FIG. 8 is a flowchart of a method for processing group message provided by yet still another embodiment of the present invention.

FIG. 8 is a flowchart of a method for processing group message provided by yet still another embodiment of the present invention. As illustrated in FIG. 8, the method for processing group message of the embodiment specifically may include the following contents.

700: when a group content corresponding to a first group identifier is updated, an AS sends a group message notification to a PUSH Server.

701: the PUSH Server sends the group message notification corresponding to the first group identifier to a GGSN, according to a transmission bearer in a group context of the PUSH Server.

In which, when the transmission bearer between the PUSH Server and the GGSN is established based on all the groups, the PUSH Server may indicate the first group identifier in a downlink data packet sent, such as an IP packet head or an IP load.

702: the GGSN sends the group message notification corresponding to the first group identifier to an SGSN according to a transmission bearer in a group context of the GGSN.

In which, when the transmission bearer between the GGSN and the SGSN is established based on all the groups, the GGSN may indicate the first group identifier by adding a field into a GTP-U head or an IP head.

703: the SGSN sends the group message notification corresponding to the first group identifier to an RNC according to a transmission bearer in a group context of the SGSN.

Similarly, when the transmission bearer between the SGSN and the RNC is established based on all the groups, the SGSN may indicate the first group identifier by adding a field into a GTP-U head or an IP head.

704: the RNC acquires indication bit and time information according to the first group identifier.

705: the RNC sends the indication bit, the time information and the first group identifier to the NodeB.

706: the NodeB indicates, in the indication bit in the notification indication channel, that the UE needs to receive the group message notification, sends the notification indication channel according to the time information; and sends in a notification control channel the first group identifier and the configuration parameters of an notification transmission channel to the UE.

707: the UE calculates the indication bit according to the first group identifier; detects, in the notification indication channel, the received indication information in the indication bit; and determines the group message is to be received according to the indication information in the indication bit.

708: the UE detects, in the notification control channel, the received first group identifier, and determines that the first group identifier is corresponding to the group in the AS joined by the UE.

For example, the UE calculates the indication bit in the same method as the RNC.

709: the UE configures the notification transmission channel according to the configuration parameters of the notification transmission channel received in the notification control channel, and receives the group message notification in the notification transmission channel.

710: the UE initiates a Radio Resource Control (RRC) connection, establishes a Radio Access Bearer (RAB) with the SGSN, and initiates a request for group message on the RAB to the AS.

711: the AS sends the group message to the UE.

For the details of steps 710-711, please refer to the prior art, and herein are omitted.

To be noted, step 710 of the embodiment is performed for the UE in an idle state. When the UE is in a URA-PCH state, after detecting the received indication information in the indication bit in the notification indication channel and receiving the predefined group identifier in the notification control channel, the UE initiates a service request to the RNC to establish a point-to-point bearer, and sends a request for group message to the RNC through the NodeB. When the UE is in a CELL-PCH or CELL-forward access channel state, after detecting the received indication information in the indication bit in the notification indication channel and receiving the predefined group identifier in the notification control channel, if the point-to-point bearer between the UE and the RNC has been established, the UE sends a request for group message to the AS in the established bearer.

Figure 9:
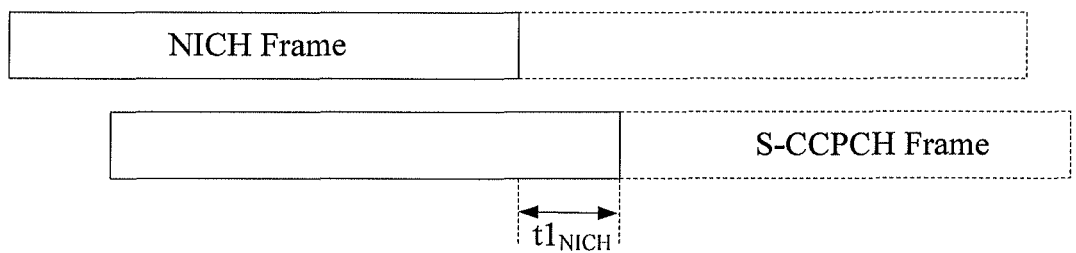
FIG. 9 is a schematic diagram of a timing relation between a notification indication channel frame and an S-CCPCH frame in yet still another embodiment of the present invention.

To be noted, in the embodiment, the RNC may indicate the NodeB to map the notification control channel for transmitting the first group identifier into the forward access channel transmission channel. That is, the sending of the first group list may be borne in the forward access channel transmission channel. The forward access channel transmission channel is further mapped into an S-CCPCH physical channel. In that case, the timing relation between a notification indication channel frame and an S-CCPCH frame is illustrated in FIG. 9, and the notification indication channel frame may be aligned with the PICH frame, wherein t1 notification indication channel represents a time difference between the notification indication channel frame and the PICH frame.

In the method for processing group message of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

Figure 10:
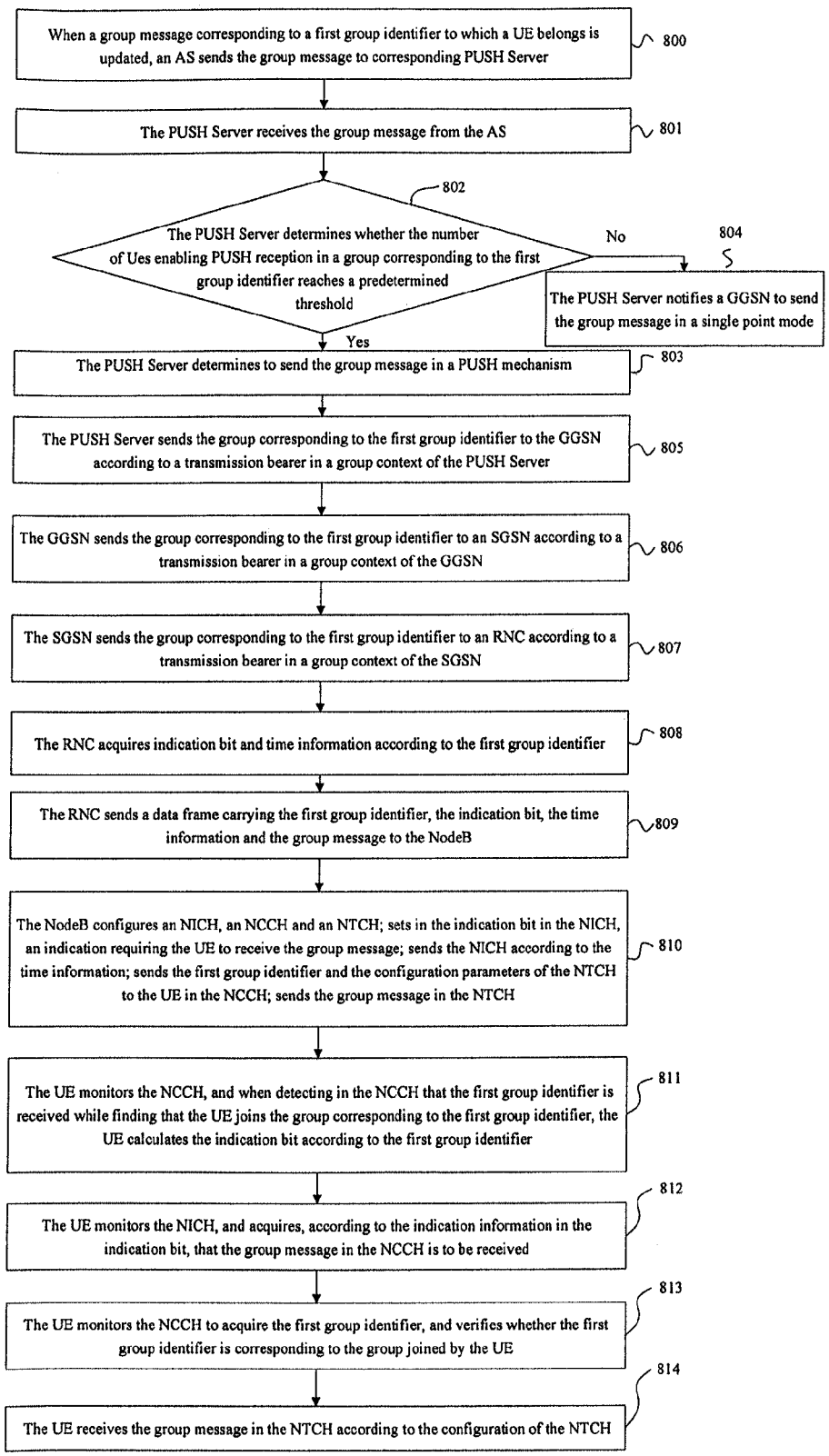
FIG. 10 is a flowchart of a method for processing group message provided by again another embodiment of the present invention.

FIG. 10 is a flowchart of a method for processing group message provided by again another embodiment of the present invention. As illustrated in FIG. 10, the method for processing group message of the embodiment specifically may include the following contents.

800: when a group message corresponding to a first group identifier to which a UE belongs is updated, an AS sends the group message to corresponding PUSH Server.

801: the PUSH Server receives the group message from the AS.

802: the PUSH Server determines whether the number of UEs enabling PUSH reception in a group corresponding to the first group identifier reaches a predetermined threshold, and if so, performing step 803, otherwise performing step 804.

803: the PUSH Server determines to send the group message in a PUSH mechanism, and then step 805 is to be performed.

804: the PUSH Server notifies a GGSN to send the group message in a single point mode.

805: the PUSH Server sends the group corresponding to the first group identifier to the GGSN according to a transmission bearer in a group context of the PUSH Server.

806: the GGSN sends the group corresponding to the first group identifier to an SGSN according to a transmission bearer in a group context of the GGSN.

807: the SGSN sends the group corresponding to the first group identifier to an RNC according to a transmission bearer in a group context of the SGSN.

808: the RNC acquires indication bit and time information according to the first group identifier.

809: the RNC sends a data frame carrying the first group identifier, the indication bit, the time information and the group message to the NodeB.

810: the NodeB configures a notification indication channel, a notification control channel and an notification transmission channel; sets in the indication bit in the notification indication channel, an indication requiring the UE to receive the group message; sends the notification indication channel according to the time information; sends the first group identifier and the configuration parameters of the notification transmission channel to the UE in the notification control channel; sends the group message in the notification transmission channel.

811: the UE monitors the notification control channel, and when detecting in the notification control channel that the first group identifier is received while finding that the UE joins the group corresponding to the first group identifier, the UE calculates the indication bit according to the first group identifier.

In which, the UE calculates the indication bit according to the first group identifier in the same method as the RNC.

812: the UE monitors the notification indication channel, and acquires, according to the indication information in the indication bit, that the group message in the notification control channel is to be received.

813: the UE monitors the notification control channel to acquire the first group identifier, and verifies whether the first group identifier is corresponding to the group joined by the UE.

814: the UE receives the group message in the notification transmission channel according to the configuration of the notification transmission channel.

In which, the UE may be in an idle state, or a connected state such as URA-PCH state, CELL-PCH state, or CELL-forward access channel state. For the UE in the connected state, the first group identifier and the configuration parameters of the notification transmission channel may be sent from being borne in the forward access channel or a high-speed downlink shared channel. The notification transmission channel bearing the group message may be borne in the forward access channel or the high-speed downlink shared channel for a transmission.

In the method for processing group message of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

Figure 11:
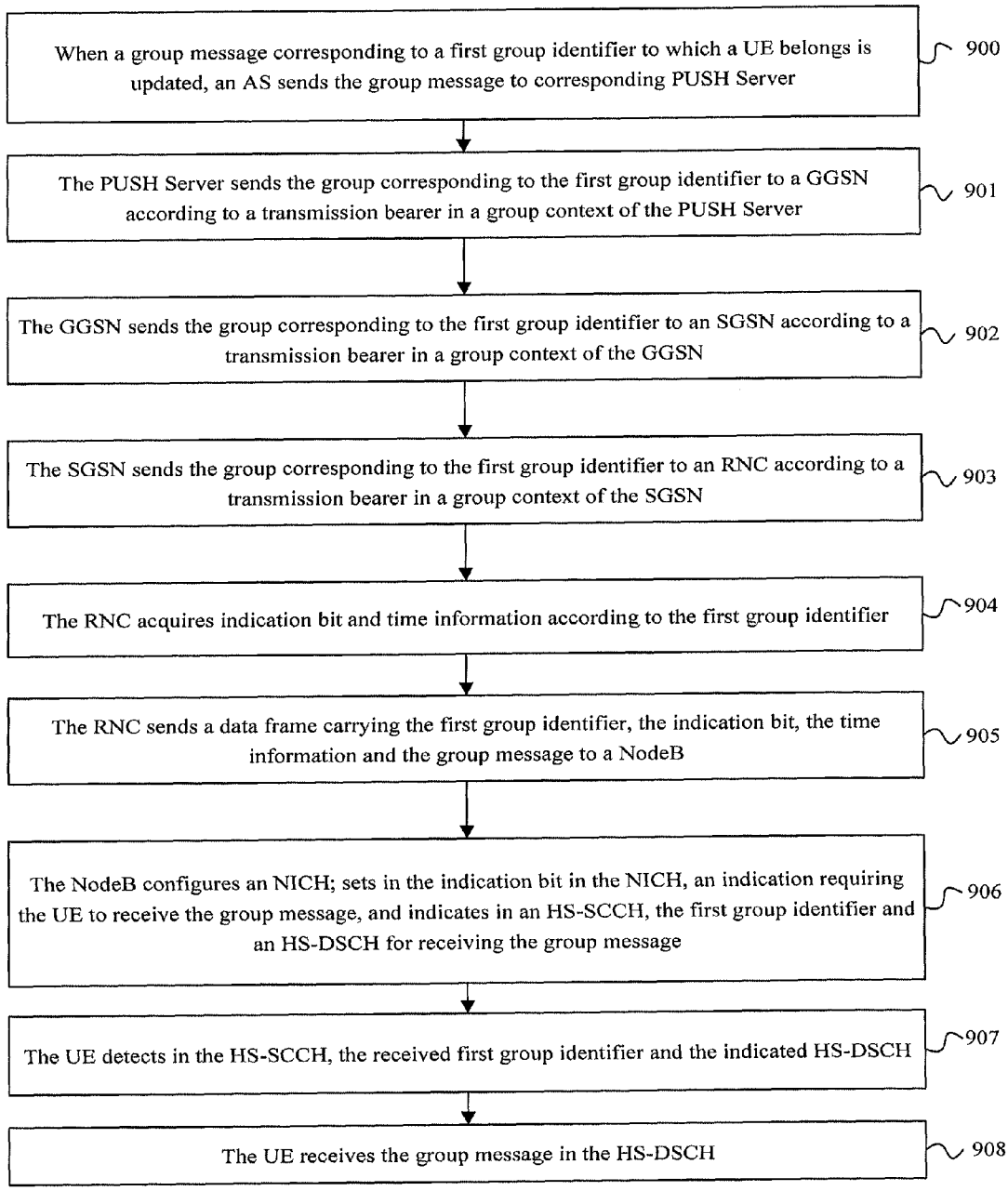
FIG. 11 is a flowchart of a method for processing group message provided by still again another embodiment of the present invention.

FIG. 11 is a flowchart of a method for processing group message provided by still again another embodiment of the present invention. As illustrated in FIG. 11, the method for processing group message of the embodiment specifically may include the following contents.

900: when a group message corresponding to a first group identifier to which a UE belongs is updated, an AS sends the group message to corresponding PUSH Server.

901: the PUSH Server sends the group corresponding to the first group identifier to a GGSN according to a transmission bearer in a group context of the PUSH Server.

902: the GGSN sends the group corresponding to the first group identifier to an SGSN according to a transmission bearer in a group context of the GGSN.

903: the SGSN sends the group corresponding to the first group identifier to an RNC according to a transmission bearer in a group context of the SGSN.

904: the RNC acquires indication bit and time information according to the first group identifier.

905: the RNC sends a data frame carrying the first group identifier, the indication bit, the time information and the group message to a NodeB.

906: the NodeB configures a notification indication channel; sets in the indication bit in the notification indication channel, an indication requiring the UE to receive the group message, and indicates in a high-speed shared control channel, the first group identifier and a high-speed downlink shared channel for receiving the group message.

907: the UE detects in the high-speed shared control channel, the received first group identifier and the indicated high-speed downlink shared channel.

908: the UE receives the group message in the high-speed downlink shared channel.

Figure 12:
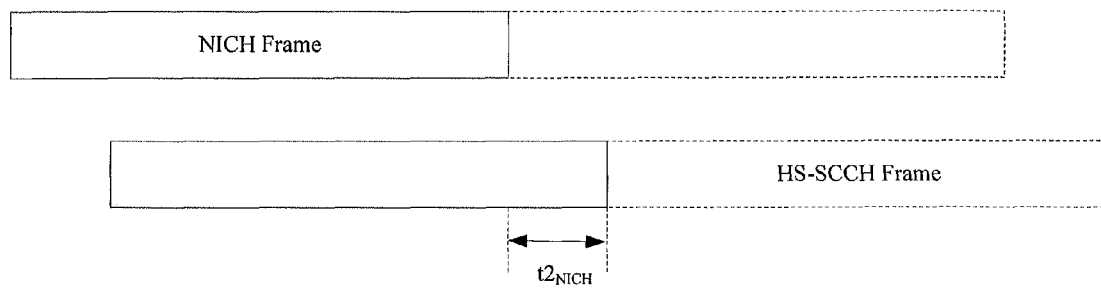
FIG. 12 is a schematic diagram of a timing relation between a notification indication channel frame and a high-speed shared control channel frame in still again another embodiment of the present invention.

In the embodiment, the timing relation between a notification indication channel frame and a high-speed shared control channel frame is illustrated in FIG. 12, wherein t2 notification indication channel represents a time difference between the notification indication channel frame and the high-speed shared control channel frame.

In the method for processing group message of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

Figure 13:
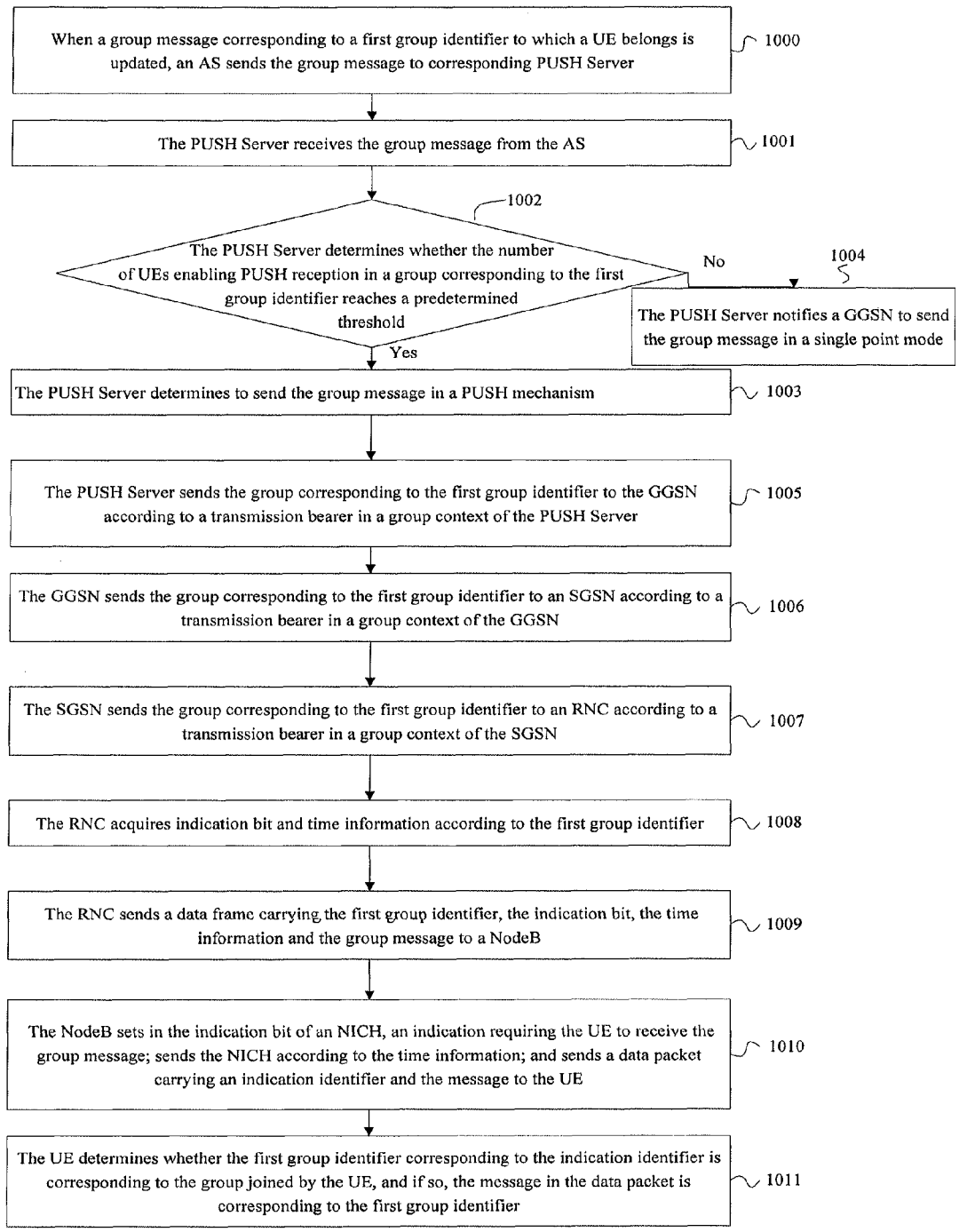
FIG. 13 is a flowchart of a method for processing group message provided by further another embodiment of the present invention.

FIG. 13 is a flowchart of a method for processing group message provided by further another embodiment of the present invention. As illustrated in FIG. 13, the method for processing group message of the embodiment specifically may include the following contents.

1000: when a group message corresponding to a first group identifier to which a UE belongs is updated, an AS sends the group message to corresponding PUSH Server; and then step 1001 is to be performed.

1001: the PUSH Server receives the group message from the AS; and then step 1002 is to be performed.

1002: the PUSH Server determines whether the number of UEs enabling PUSH reception in a group corresponding to the first group identifier reaches a predetermined threshold, and if so, performing step 1003, otherwise performing step 1004.

1003: the PUSH Server determines to send the group message in a PUSH mechanism; and then step 1005 is to be performed.

1004: the PUSH Server notifies a GGSN to send the group message in a single point mode.

1005: the PUSH Server sends the group corresponding to the first group identifier to the GGSN according to a transmission bearer in a group context of the PUSH Server; and then step 1006 is to be performed.

1006: the GGSN sends the group corresponding to the first group identifier to an SGSN according to a transmission bearer in a group context of the GGSN; and then step 1007 is to be performed.

1007: the SGSN sends the group corresponding to the first group identifier to an RNC according to a transmission bearer in a group context of the SGSN; and then step 1008 is to be performed.

1008: the RNC acquires indication bit and time information according to the first group identifier; and then step 1009 is to be performed.

1009: the RNC sends a data frame carrying the first group identifier, the indication bit, the time information and the group message to a NodeB; and then step 1010 is to be performed.

1010: the NodeB sets in the indication bit of a notification indication channel, an indication requiring the UE to receive the group message; sends the notification indication channel according to the time information; and sends a data packet carrying an indication identifier and the message to the UE; then step 1011 is to be performed.

The indication identifier indicates corresponding first group identifier or a bit position in corresponding notification indication channel.

1011: the UE determines whether the first group identifier corresponding to the indication identifier is corresponding to the group joined by the UE, and if so, the message in the data packet is corresponding to the first group identifier.

In which, the UE can also determine whether the bit in the notification indication channel corresponding to the indication identifier is the indication bit calculated by the UE according to the first group identifier, and if yes, determine that the message in the data packet is corresponding to the first group identifier.

In the embodiment, the indication identifier may be set in an MAC head in the downlink packet sent to the UE. When the UE in the URA-PCH state, the CELL-PCH state or the CELL-forward access channel state detects that the notification indication channel determines to receive the group message, the UE notifies, after a certain time migration, to receive the HS-PDSCH or S-CCPCH frame, and acquires the indication identifier in the MAC head to determine whether to receive or discard the downlink packet.

In the method for processing group message of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

A person skilled in the art shall appreciate that all or a part of steps in the above method embodiments may be implemented by instructing relevant hardware through a program that may be stored in a computer readable storage medium. When the program is executed, the steps of the method embodiments are carried out. The storage medium includes any medium capable of storing program codes, such as Read-Only Memory (ROM), Random Access Memory (RAM), magnetic disc or optical disc.

Figure 14:
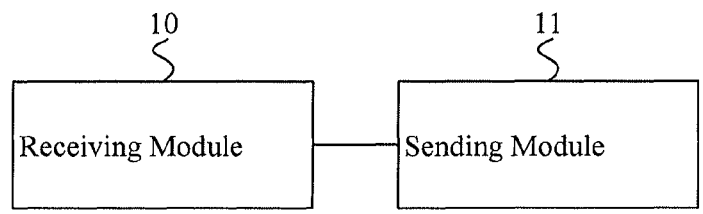
FIG. 14 is a structure diagram of a PUSH server device provided by an embodiment of the present invention.

FIG. 14 is a structure diagram of a PUSH server device provided by an embodiment of the present invention. As illustrated in FIG. 14, the PUSH server device of the embodiment specifically may include a receiving module 10 and a sending module 11.

In which, the receiving module 10 is configured to receive a message corresponding to a first group identifier sent from a PDN, when a group corresponding to the first group identifier has an updated group message, wherein the message is the updated group message or a group message notification. The sending module 11 is connected to the receiving module 10 and configured to send the message corresponding to the first group identifier received by the receiving module 10 to a core network node, so that the core network node sends the message to an RNC, which acquires, according to the first group identifier, indication bit and time information for sending the message; send the first group identifier, the indication bit, the time information and the message to a NodeB, indicate the NodeB to set a bit according to the indication bit, and send the indication bit, the first group identifier and the message to a UE corresponding to a user in the group corresponding to the first group identifier in a service range of the NodeB, according to the time information.

In the PUSH server device of the embodiment, the above modules are used to send the group message in the same sending mechanism as related method embodiments mentioned above. For the details, please refer to the descriptions of related method embodiments, and herein are omitted.

By using the above modules, the PUSH server device of the embodiment can send a group message or a group message notification to the UEs in a group of the AS on a group basis when the group has an updated message. In addition, the group message or the group message notification only needs to be sent to the UEs in the same group for one time, rather than to different UEs respectively for multiple times in the prior art, thus the efficiency for the AS to send a message to each UE in the group can be effectively improved.

To be noted, the sending module 11 in the PUSH server device of the embodiment is specifically configured to send the message corresponding to the first group identifier received by the receiving module 10 to the core network node, through a transmission bearer with the core network node established for the group corresponding to the first group identifier. Or the sending module 11 is specifically configured to send the message carrying the first group identifier to the GGSN, through a transmission bearer with the core network node established for all the groups. For example, the message sent to the core network node may be obtained by carrying the first group identifier in the message received by the receiving module 10.

When the PUSH Server and the GGSN are provided separately, the core network node in the embodiment is a GGSN. In that case, the sending module 11 is configured to send a message corresponding to the first group identifier received by the receiving module 10 to the GGSN, so that the GGSN sends the message to the RNC through the SGSN.

Figure 15:
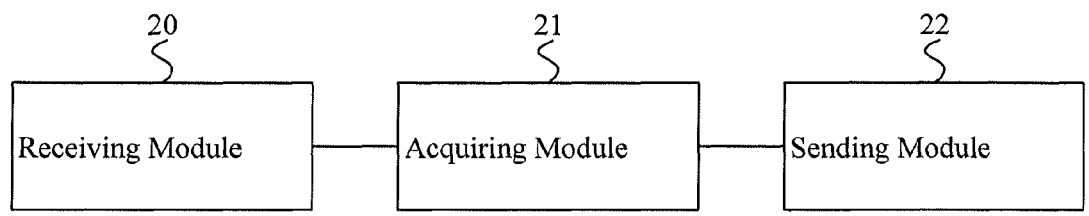
FIG. 15 is a structure diagram of an RNC device provided by an embodiment of the present invention.

FIG. 15 is a structure diagram of an RNC device provided by an embodiment of the present invention. As illustrated in FIG. 15, the RNC device of the embodiment specifically may include a receiving module 20, an acquiring module 21 and a sending module 22.

In which, the receiving module 20 is configured to receive a message corresponding to a first group identifier sent from a core network node, wherein the message is an updated group message in the group corresponding to the first group identifier or a group message notification. The acquiring module 21 is connected to the receiving module 20 and configured to acquire, according to the first group identifier corresponding to the message received by the receiving module 20, indication bit and time information for sending the message. The sending module 22 is connected to the receiving module 10 and the acquiring module 11, respectively, and configured to send the first group identifier, the indication bit and the time information acquired by the acquiring module 11 and the message received by the receiving module 20 to a NodeB, indicate the NodeB to set indication information in the indication bit and indicate the NodeB to send the indication information set in the indication bit, the first group identifier and the message to a UE corresponding to a user in the group corresponding to the first group identifier in a service range of the NodeB, according to the time information.

In the embodiment, the core network node is an SGSN.

In the RNC device of the embodiment, the above modules are used to send the group message in the same sending mechanism as related method embodiments mentioned above. For the details, please refer to the descriptions of related method embodiments, and herein are omitted.

By using the above modules, the RNC device of the embodiment can send a group message to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

To be noted, the receiving module 20 of the embodiment is specifically configured to receive the message corresponding to the first group identifier sent from the SGSN, through a transmission bearer with the core network node such as the SGSN established for the group corresponding to the first group identifier. Or the receiving module 20 is specifically configured to receive the message carrying the first group identifier sent from the SGSN, through a transmission bearer with the SGSN established for all the groups.

To be noted, the sending module 22 of the embodiment is specifically configured to send the first group identifier, the indication bit and the time information acquired by the acquiring module 21, and the message received by the receiving module 20 to the NodeB, indicate the NodeB to set the indication information in the indication bit in a notification indication channel, indicate the NodeB to send information in the notification indication channel to the UE according to the time information, and indicate the NodeB to send the first group identifier and configuration information of an notification transmission channel to the UE in a notification control channel, and send the information to the UE through the notification transmission channel.

To be noted, the sending module 22 of the embodiment specifically may be further configured to send the first group identifier, the indication bit and the time information acquired by the acquiring module 21 and the message received by the receiving module 20 to the NodeB, indicate the NodeB to set the indication information in the indication bit in a notification indication channel, and indicate the NodeB to send information in the notification indication channel to the UE according to the time information, indicate the NodeB to map a notification control channel bearing the first group identifier and configuration information of an notification transmission channel into an forward access channel or a high-speed downlink shared channel, so as to transmit the first group identifier and the configuration information of the notification transmission channel to the UE, and indicate the NodeB to map the notification transmission channel bearing the message into the forward access channel or the high-speed downlink shared channel, so as to transmit the message to the UE.

To be noted, the sending module 22 of the embodiment specifically may be further configured to send the first group identifier, the indication bit and the time information acquired by the acquiring module 21 and the message received by the receiving module 20 to the NodeB, indicate the NodeB to set the indication information in the indication bit in a notification indication channel, indicate the NodeB to send information in the notification indication channel to the UE according to the time information, indicate the NodeB to send the first group identifier to the UE in a high-speed shared control channel, and indicate the NodeB to send the information to the UE in a high-speed shared data channel indicated by the high-speed shared control channel.

To be noted, the sending module 22 of the embodiment specifically may be further configured to send the first group identifier, the indication bit and the time information acquired by the acquiring module 21 and the message received by the receiving module 20 to the NodeB, indicate the NodeB to set the indication information in the indication bit in the notification indication channel, indicate the NodeB to send information in the notification indication channel to the UE according to the time information; and indicate the NodeB to send a data packet carrying an indication identifier and the message to the UE, wherein the indication identifier indicates the first group identifier or a position of the indication bit.

In the above technical solution of the embodiment, the group message is sent in the same sending mechanism as related method embodiments aforementioned. For the details, please refer to the descriptions of related method embodiments, and herein are omitted.

Through the technical solution of the embodiment, a group message or a group message notification may be sent to the UEs in a group of the AS on a group basis when the group has an updated message. In addition, the group message or the group message notification only needs to be sent to the UEs in the same group for one time, rather than being sent to different UEs respectively for multiple times in the prior art, thus the efficiency for the AS to send a message to each UE in the group can be effectively improved.

Figure 16:
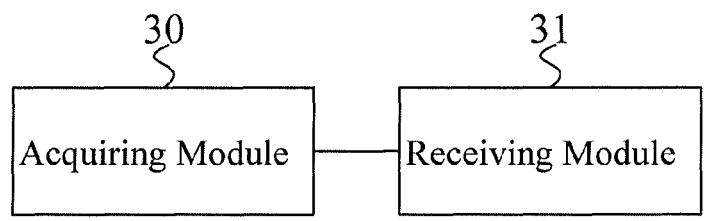
FIG. 16 is a structure diagram of a UE provided by an embodiment of the present invention.

FIG. 16 is a structure diagram of a UE provided by an embodiment of the present invention. As illustrated in FIG. 16, the UE of the embodiment specifically may include an acquiring module 30 and a receiving module 31.

In which, the acquiring module 30 is configured to acquire indication bit according to a pre-stored first group identifier. The acquiring module 30 is further configured to acquire indication information in the indication bit, and determining whether to receive a message corresponding to the first group identifier, wherein the message is an updated group message or a group message notification corresponding to the first group identifier, and the indication information is set in the indication bit by a NodeB according to an indication of an RNC. The receiving module 31 is connected to the acquiring module 30 and configured to receive the first group identifier sent from the NodeB according to the indication of the RNC when the message corresponding to the first group identifier is determined to be received after the acquiring module 30 acquires the indication information in the indication bit, and verify whether the received first group identifier is same as the pre-stored first group identifier. When the received first group identifier is same as the pre-stored first group identifier, the receiving module 31 is further configured to receive the message sent from the NodeB according to the indication of the RNC.

In the UE of the embodiment, the above modules are used to receive the group message in the same receiving mechanism as related method embodiments mentioned before. For the details, please refer to the descriptions of related method embodiments, and herein are omitted.

By using the above modules, the UE of the embodiment can send a group message to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

To be noted, the acquiring module 30 of the embodiment is specifically configured to acquire the indication information from the indication bit in a notification indication channel sent according to the time information acquired from the first group identifier by the NodeB according to the indication of the RNC.

To be noted, the receiving module 31 of the UE of the embodiment is specifically configured to receive the first group identifier and the configuration information of an notification transmission channel sent in a notification control channel by the NodeB according to the indication of the RNC; and configure the notification transmission channel according to the configuration information of the notification transmission channel, and receive in the notification transmission channel, the message sent from the NodeB according to the indication of the RNC.

To be noted, the receiving module 31 of the UE of the embodiment specifically may be further configured to receive the first group identifier from an forward access channel or a high-speed downlink shared channel into which a notification control channel is mapped by the NodeB according to the indication of the RNC; and receive the message from an forward access channel or a high-speed downlink shared channel into which an notification transmission channel is mapped by the NodeB according to the indication of the RNC.

To be noted, the receiving module 31 of the UE of the embodiment specifically may be further configured to receive the first group identifier from a high-speed shared control channel; and receive the information sent from the NodeB according to the indication of the RNC from a high-speed shared data channel indicated by the high-speed shared control channel.

In the above technical solution of the embodiment, the group message is received in the same receiving mechanism as related method embodiments aforementioned. For the details, please see descriptions of related method embodiments, and herein are omitted.

Through the technical solution of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

Figure 17:
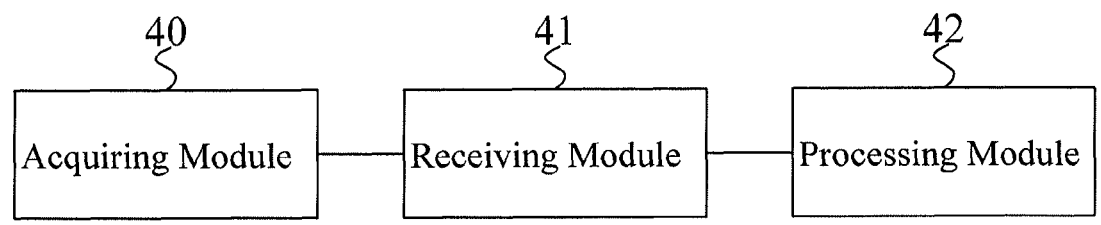
FIG. 17 is a structure diagram of a UE provided by another embodiment of the present invention.

FIG. 17 is a structure diagram of a UE provided by another embodiment of the present invention. As illustrated in FIG. 17, the UE of the embodiment specifically may include an acquiring module 40, a receiving module 41 and a processing module 42. In which, the acquiring module 40 is configured to acquire indication bit according to a pre-stored first group identifier. The acquiring module 40 is further configured to acquire indication information in the indication bit, and determine whether to receive a message corresponding to the first group identifier, wherein the message is an updated group message or a group message notification corresponding to the first group identifier, and the indication information is set in the indication bit by a NodeB according to an indication of an RNC. The receiving module 41 is connected to the acquiring module 40, and configured to receive a data packet carrying an indication identifier and the message sent from the NodeB according to the indication of the RNC when the acquiring module 40 determines to receive the message corresponding to the first group identifier. The processing module 42 is connected to the receiving module 41, and configured to detect whether a first group identifier corresponding to the indication identifier is same as the pre-stored first group identifier, and if so, determine that the message is corresponding to the first group identifier.

In the UE of the embodiment, the above modules are used to receive the group message in the same receiving mechanism as related method embodiments mentioned before. For the details, please refer to the descriptions of related method embodiments, and herein are omitted.

By using the above modules, the UE of the embodiment can send a group message to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

To be noted, the acquiring module 40 of the embodiment is specifically configured to acquire the indication information from the indication bit in the notification indication channel sent according to the time information acquired from the first group identifier by the NodeB according to the indication of the RNC.

In the technical solution of the embodiment, the group message is received in the same receiving mechanism as related method embodiments aforementioned. For the details, please see descriptions of related method embodiments, and herein are omitted.

Through the technical solution of the embodiment, a group message may be sent to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

Figure 18:
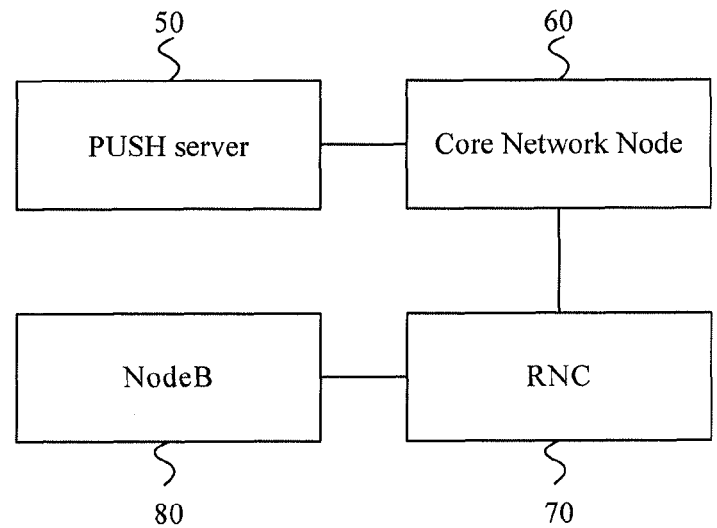
FIG. 18 is a structure diagram of a mobile communication network provided by an embodiment of the present invention.

FIG. 18 is a structure diagram of a mobile communication network provided by an embodiment of the present invention. As illustrated in FIG. 18, the mobile communication network of the embodiment specifically may include a PUSH server 50, a core network node 60, an RNC 70 and a NodeB 80.

In which, the PUSH server 50 is configured to receive a message corresponding to a first group identifier sent from an AS, when a group corresponding to the first group identifier has an updated group message, wherein the message is the updated group message or a group message notification; and send the message corresponding to the first group identifier to a core network node 60. The core network node 60 is configured to receive the message from the PUSH server 50 and send the message to an RNC 70. The RNC 70 is configured to receive the message from the core network node 60 and acquire, according to the first group identifier, indication bit and time information for sending the group message; send the first group identifier, the indication bit, the time information and the message to the NodeB 80; indicate the NodeB 80 to set a bit according to the indication bit and send the indication bit, the first group identifier and the message to a UE corresponding to a user in the group corresponding to the first group identifier in a service range of the NodeB 80, according to the time information.

When the PUSH server 50 is integrated with the GGSN, i.e., the PUSH server 50 integrates the functions of the GGSN, the core network node 60 herein may be regarded as the SGSN. When the PUSH server and the GGSN are provided separately, the core network node herein may include the GGSN and the SGSN. In that case, the GGSN is configured to receive the message from the PUSH server 50, and sends the message to the RNC 70 through the SGSN.

The PUSH server 50 of the embodiment may employ the PUSH server device of related embodiments aforementioned, and the RNC 70 herein may employ the RNC device of related embodiments aforementioned.

In the above technical solution of the embodiment, the group message is sent and received in the same sending and receiving mechanisms as related method embodiments aforementioned. For the details, please refer to the descriptions of related method embodiments, and herein are omitted.

The mobile communication network of the embodiment can send a group message to the UEs in a group on a group basis, so that it is received by each UE in the group. As compared with the prior art, through the technical solution of the embodiment, the UEs in the same group only requires one sending at the network side, thus the efficiency for transmitting the group message can be effectively improved.

A person skilled in the art can clearly appreciate that in order to describe conveniently and concisely, the detailed working processes of the described system, device and units are omitted herein, please refer to corresponding processes in the method embodiments aforementioned for the details.

The above described device embodiments are just exemplary, wherein the units described as separate parts may be or may not be physically separated, and the parts displayed as units may be or may not be physical units, i.e., they may be located at the same place or distributed to at least two network elements. The object of the solution of the embodiment may be achieved by selecting parts or all of the modules upon actual demand. The present invention can be understood and implemented by a person skilled in the art without paying any creative effort.

The units described as separate parts may be or may not be physically separated, and the parts displayed as units may be or may not be physical units, i.e., they may be located at the same place or distributed to multiple network elements. The object of the solution of the embodiment may be achieved by selecting parts or all of the units upon actual demand.

In addition, various functional units in the embodiments of the present invention may be integrated into one processing unit, or existed as individual physical units, or two or more units may be integrated into one unit. The integrated units may be implemented in the form of hardware or software functional units.

When the integrated units are implemented in the form of software functional units and sold or used as individual products, they may be stored in a computer readable access medium. Based on such understanding, the technical solution of the present invention substantively, a part thereof making a contribution to the prior art, or the whole or a part of the technical solution, may be reflected in the form of software product which is stored in a storage medium, including several instructions to enable a computer device (e.g., personal computer, server, network facility, etc.) or a processor to execute all or a part of the steps of the methods of respective embodiments. The storage medium includes various mediums capable of storing the program codes, such as U-disc, mobile hard disc, Read-Only Memory (ROM), Random Access Memory (RAM), magnetic disc, optical disc, etc.

Finally to be noted, the above embodiments are just used to describe the technical solutions of the present invention, rather than making limitations thereto. Although the present invention is described in details with reference to the above embodiments, a person skilled in the art shall appreciate that the technical solutions of the above embodiments can be modified, or some technical features thereof can be equivalently substituted, while those modifications or substitutions do not cause the essences of corresponding technical solutions to deviate from the range of the technical solutions of the embodiments of the present invention.

We claim:

1. A method for processing group message, comprising:
receiving, by a push server, a message corresponding to a first group identifier sent from a public data network when a group corresponding to the first group identifier has an updated group message, wherein the message corresponding to the first group identifier is the updated group message or a group message notification;

sending, by the push server, the message corresponding to the first group identifier to a core network node, wherein the core network node sends the message corresponding to the first group identifier to a radio network controller, and the radio network controller acquires, according to the first group identifier, indication bit and time information for sending of the message corresponding to the first group identifier; and sending, by the radio network controller, the first group identifier, the indication bit, the time information and the message corresponding to the first group identifier to a base station, wherein the base station sets a bit according to the indication bit, and sends the indication bit, the first group identifier and the message corresponding to the first group identifier to a user equipment belonging to the group identified by a second group identifier corresponding to the first group identifier in a service range of the base station, according to the time information, wherein the second group identifier is an identifier used by the user equipment in an application server, and a mapping relation is established between the first group identifier and the second group identifier.

2. The method according to claim 1, further comprising: sending, by the push server, the message corresponding to the first group identifier to the core network node through a transmission bearer with the core network node established for the group corresponding to the first group identifier.

3. The method according to claim 1, further comprising: sending, by the push server, the message corresponding to the first group identifier carrying the first group identifier to the core network node through a transmission bearer with the core network node established for multiple different groups.

4. A method for processing group message, comprising:
receiving, by a radio network controller, a message corresponding to a first group identifier sent from a core network node, wherein the message corresponding to the first group identifier is an updated group message in a group corresponding to the first group identifier or a group message notification;

acquiring, by the radio network controller, according to the first group identifier, indication bit and time information for sending the message corresponding to the first group identifier; and sending, by the radio network controller, the first group identifier, the indication bit, the time information and the message corresponding to the first group identifier to a base station, wherein the base station sets indication information in the indication bit, and sends the indication information set in the indication bit, the first group identifier and the message corresponding to the first group identifier to a user equipment belonging to the group corresponding to the first group identifier in a service range of the base station, wherein the base station sets the indication information in the indication bit in a notification indication channel, sends information in the notification indication channel to the user equipment according to the time information, and one or more of:

sends the first group identifier and configuration information of a notification transmission channel to the user equipment in a notification control channel, and sends the information to the user equipment through the notification transmission channel;

maps a notification control channel bearing the first group identifier and configuration information of a notification transmission channel into a forward access channel or a high-speed downlink shared channel, and transmits the first group identifier and the configuration information of the notification transmission channel to the user equipment, and maps the notification transmission channel bearing the message corresponding to the first group identifier into the forward access channel or the high-speed downlink shared channel, and transmits the message corresponding to the first group identifier to the user equipment;

sends the first group identifier to the user equipment in a high-speed shared control channel, and sends the information to the user equipment in a high-speed shared data channel indicated by the high-speed shared control channel; or sends a data packet carrying an indication identifier and the message corresponding to the first group identifier to the user equipment, wherein the indication identifier indicates the first group identifier or a position of the indication bit.

5. The method according to claim 4, further comprising: receiving, by the radio network controller, the message corresponding to the first group identifier sent from the core network node through a transmission bearer with the core network node established for the group corresponding to the first group identifier.

6. The method according to claim 4, further comprising: receiving, by the radio network controller, the message corresponding to the first group identifier carrying the first group identifier sent from the core network node through a transmission bearer with the core network node established for multiple different groups.

7. A system, comprising:
a push server device configured to establish a mapping relationship between a first group identifier and a second group identifier that corresponds to a group in an application server; the push server device comprising:

a receiver configured to receive a message corresponding to the first group identifier sent from a public data network, when a group corresponding to the first group identifier has an updated group message, wherein the message corresponding to the first group identifier is the updated group message or a group message notification;

a transmitter configured to send the message corresponding to the first group identifier to a core network node, wherein the core network node sends the message corresponding to the first group identifier to a radio network controller, and wherein the radio network controller acquires, according to the first group identifier, indication bit and time information for sending the message corresponding to the first group identifier, and wherein the radio network controller sends the first group identifier, the indication bit, the time information and the message corresponding to the first group identifier to a base station, wherein the base station sets a bit according to the indication bit, and sends the indication bit, the first group identifier and the message corresponding to the first group identifier to a user equipment belonging to the group identified by the second group identifier mapped by the push server device to the first group identifier in a service range of the base station, according to the time information, wherein the second group identifier is an identifier used by the user equipment in the application server.

8. The system according to claim 7, wherein the transmitter is specifically configured to send the message corresponding to the first group identifier to the core network node, through a transmission bearer with the core network node established for the group corresponding to the first group identifier.

9. The system according to claim 7, wherein the transmitter is configured to send the message corresponding to the first group identifier carrying the first group identifier to the core network node, through a transmission bearer with the core network node established for multiple different groups.

10. A radio network controller device, comprising:
a receiver configured to receive a message corresponding to a first group identifier sent from a core network node, wherein the message corresponding to the first group identifier is an updated group message in the group corresponding to the first group identifier or a group message notification;
a processor configured to acquire, according to the first group identifier, indication bit and time information for sending the message corresponding to the first group identifier; and
a transmitter configured to send the first group identifier, the indication bit, the time information and the message corresponding to the first group identifier to a base station, wherein the base station sets indication information in the indication bit, and sends the indication information set in the indication bit, the first group identifier and the message corresponding to the first group identifier to a user equipment belonging to the group corresponding to the first group identifier in a service range of the base station, wherein the base station sets the indication information in the indication bit in a notification indication channel, sends information in the notification indication channel to the user equipment according to the time information, and one or more of:
  sends the first group identifier and configuration information of an notification transmission channel to the user equipment in a notification control channel, and sends the information to the user equipment through the notification transmission channel;
  maps a notification control channel bearing the first group identifier and configuration information of an notification transmission channel into an forward access channel or a high-speed downlink shared channel, and transmits the first group identifier and the configuration information of the notification transmission channel to the user equipment, and maps the notification transmission channel bearing the message corresponding to the first group identifier into the forward access channel or the high-speed downlink shared channel, and transmits the message corresponding to the first group identifier to the user equipment;
  sends the first group identifier to the user equipment in a high-speed shared control channel, and sends the information to the user equipment in a high-speed shared data channel indicated by the high-speed shared control channel; or
  sends a data packet carrying an indication identifier and the message corresponding to the first group identifier to the user equipment, wherein the indication identifier indicates the first group identifier or a position of the indication bit.

11. The device according to claim 10, wherein the receiver is configured to receive the message corresponding to the first group identifier sent from the core network node, through a transmission bearer with the core network node established for the group corresponding to the first group identifier.

12. The device according to claim 10, wherein the receiver is configured to receive the message corresponding to the first group identifier carrying the first group identifier sent from the core network node, through a transmission bearer with the core network node established the multiple different groups.

* * * * *